United States Patent
Kojima et al.

(10) Patent No.: US 10,566,796 B2
(45) Date of Patent: Feb. 18, 2020

(54) CONTROL METHOD OF POWER GENERATION SYSTEM, POWER GENERATION SYSTEM, AND POWER GENERATION APPARATUS

(71) Applicant: KYOCERA CORPORATION, Kyoto-shi, Kyoto (JP)

(72) Inventors: Masaya Kojima, Kawasaki (JP); Hitoshi Inoue, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 281 days.

(21) Appl. No.: 15/325,407

(22) PCT Filed: Jul. 10, 2015

(86) PCT No.: PCT/JP2015/003493
§ 371 (c)(1),
(2) Date: Jan. 10, 2017

(87) PCT Pub. No.: WO2016/006256
PCT Pub. Date: Jan. 14, 2016

(65) Prior Publication Data
US 2017/0187191 A1    Jun. 29, 2017

(30) Foreign Application Priority Data

Jul. 10, 2014 (JP) ................................ 2014-142751
Jul. 10, 2014 (JP) ................................ 2014-142752

(51) Int. Cl.
*H02J 3/38*    (2006.01)
*H02S 40/32*   (2014.01)
*H02M 3/04*    (2006.01)
*H02M 7/44*    (2006.01)
*H02J 1/10*    (2006.01)

(52) U.S. Cl.
CPC .............. *H02J 3/383* (2013.01); *H02J 3/387* (2013.01); *H02M 3/04* (2013.01); *H02M 7/44* (2013.01);
(Continued)

(58) Field of Classification Search
CPC .................................................. Y02E 10/563
See application file for complete search history.

(56) References Cited

U.S. PATENT DOCUMENTS

| | | |
|---|---|---|
| 2004/0032127 A1 | 2/2004 | Tokiwa et al. |
| 2012/0116696 A1* | 5/2012 | Wank .................... G01R 31/42 702/58 |
| 2016/0105026 A1* | 4/2016 | Lila ........................ H02S 10/00 307/24 |

FOREIGN PATENT DOCUMENTS

| | | |
|---|---|---|
| JP | 2002-247765 A | 8/2002 |
| JP | 2002-281671 A | 9/2002 |

(Continued)

OTHER PUBLICATIONS

Extended European Search Report dated Feb. 8, 2018, issued by the European Patent Office in counterpart European Patent Application No. 15 819159.3.

(Continued)

*Primary Examiner* — Daniel J Cavallari
(74) *Attorney, Agent, or Firm* — Procopio Cory Hargreaves and Savitch LLP

(57) ABSTRACT

A control method of the power generation system of the disclosure is a control method of a power generation system configured with a power generation apparatus and at least one other power generation apparatus coupled to the power generation apparatus herein, the power generation system configured to interconnect with a grid and supply power to a load, wherein a process performed by the power generation apparatus includes a step of obtaining a current value between the power generation system and the grid, a step of determining, based on the current value, respective target power to be generated by the power generation apparatuses, (Continued)

and the other power generation apparatuses, and a step of notifying the other power generation apparatuses of the respective target power.

13 Claims, 12 Drawing Sheets

(52) U.S. Cl.
CPC ............... *H02S 40/32* (2014.12); *H02J 1/10* (2013.01); *Y02E 10/563* (2013.01)

(56) References Cited

FOREIGN PATENT DOCUMENTS

| | | |
|---|---|---|
| JP | 2004-328856 A | 11/2004 |
| JP | 2006-094653 A | 4/2006 |
| JP | 2007-020260 A | 1/2007 |
| JP | 2009-284569 A | 12/2009 |
| JP | 2014-110649 A | 6/2014 |
| WO | 2013/088798 A1 | 6/2013 |

OTHER PUBLICATIONS

International Search Report dated Sep. 8, 2015 issued by the Japanese Patent Office in counterpart International Application No. PCT/JP2015/003493.

Written Opinion of the International Search Authority dated Sep. 8, 2016 issued by the Japanese Patent Office in counterpart International Application No. PCT/JP2015/003493.

\* cited by examiner

FIG. 2

| Total output x | Power generation apparatus 10A | Power generation apparatus 10B | Power generation apparatus 10C |
|---|---|---|---|
| 8.0kW<x | x-6.0kW | 3.0kW | 3.0kW |
| 7.0kW<x≤8.0kW | x-6.0kW | 3.0kW | 3.0kW |
| 6.0kW<x≤7.0kW | x-6.0kW | 3.0kW | 3.0kW |
| 5.0kW<x≤6.0kW | x-3.0kW | 3.0kW | 0kW |
| 4.0kW<x≤5.0kW | x-2.0kW | 2.0kW | 0kW |
| 3.0kW<x≤4.0kW | x-1.0kW | 1.0kW | 0kW |
| 2.0kW<x≤3.0kW | x | 0kW | 0kW |
| 1.0kW<x≤2.0kW | x | 0kW | 0kW |
| x≤1.0kW | x | 0kW | 0kW |

CONTROL METHOD OF POWER GENERATION SYSTEM, POWER GENERATION SYSTEM, AND POWER GENERATION APPARATUS

CROSS REFERENCE TO RELATED APPLICATIONS

This application claims priority to and the benefit of Japanese Patent Applications No. 2014-142751 and No. 2014-142752 both filed on Jul. 10, 2014, the entire contents of which are incorporated herein by reference.

TECHNICAL FIELD

This disclosure relates to a control method of a power generation system, a power generation system, and a power generation apparatus.

BACKGROUND

In recent years, it has been suggested to employ a plurality of distributed power sources and, based on power which can be supplied by the distributed power sources, to control power consumption of a load (e.g. see PLT 1).

Also, for example, PLT 2 discloses a distribution board system in which a solar photovoltaic power generation system and a gas power generation system are coupled to a grid via respective current sensors and breakers. This distribution board system, when detecting a reverse power flow from the gas power generation system to the grid, operates to reduce or stop a power output from the gas power generation system.

CITATION LIST

Patent Literature

PLT 1: JP2007020260A
PLT 2: JP2004328856A

SUMMARY

Technical Problem

As described above, in the conventional power generation system for operating a plurality of distributed power sources coupled to one another, in order to detect a current of a reverse power flow, the plurality of distributed power sources are configured to include respective current sensors for detecting the reverse power flow.

FIG. 12 is a block diagram illustrating a schematic configuration of a conventional power generation system for operating a plurality of distributed power sources coupled to one another. As illustrated in FIG. 12, a power generation system 60 includes a plurality of distributed power sources (power generation apparatuses) 80A, 80B, and 80C. The plurality of power generation apparatuses 80A to 80C interconnect with a grid 100 and supply power to a load 200. As illustrated in FIG. 12, also, the power generation apparatuses 80A, 80B, and 80C are respectively coupled to current sensors 18A, 18B, and 18C. Accordingly, in the power generation system 60, since the current sensors 18A to 18C detect the current of the reverse power flow upon occurrence of the reverse power flow, outputs of the power generation apparatuses 80A to 80C may be suppressed.

Such a configuration in which a plurality of distributed power sources detect the reverse power flow by using the respective current sensors needs as many current sensors as the distributed power sources, even though the current sensor is relatively expensive. Therefore, the cost of providing the current sensors increases in proportion to the number of distributed power sources. Also, in disposing a plurality of current sensors for detecting the reverse power flow as described above, a structural problem such as securing installation space may arise. Further, upon detection of the reverse power flow, since all the power generation apparatuses control to reduce respective power outputs, it may led to a temporary sharp decrease in power supply from the power generation apparatuses.

Therefore, it could be helpful to provide a power generation system having a simple configuration for efficiently performing an operation to prevent the reverse power flow of the power from a plurality of power generation apparatuses.

Solution to Problem

A control method of a power generation system according to an embodiment of the disclosure is a control method of a power generation system configured with a power generation apparatus and at least one other power generation apparatus coupled to the power generation apparatus, the power generation system configured to interconnect with a grid and supply power to a load, wherein the control method performed by the power generation apparatus includes steps of: obtaining a current value between the power generation system and the grid, determining, based on the current value obtained, target power to be generated by the power generation apparatus and the other power generation apparatus, and notifying the other power generation apparatus of the target power.

Also, a power generation system according to an embodiment of the disclosure is a power generation system configured with a power generation apparatus and at least one other power generation apparatus coupled to the power generation apparatus, the power generation system configured to interconnect with a grid and supply power to a load, wherein the power generation apparatus determines, based on a current detected between the power generation system and the grid, target power to be generated by the power generation apparatus and the other power generation apparatus and notifies the other power generation apparatus of the target power.

Further, a power generation apparatus according to an embodiment of the disclosure is a power generation apparatus coupled to at least one other power generation apparatus, the power generation apparatus configured to interconnect with a grid and supply power to a load, wherein the power generation apparatus determines, based on a current detected between the power generation apparatus and the other power generation apparatus, and the grid, target power to be generated by the power generation apparatus and the other power generation apparatus and notifies the other power generation apparatus of the target power.

Advantageous Effect

The disclosure may provide a power generation system having a simple configuration for efficiently performing an operation to prevent a reverse power flow from a plurality of power generation apparatuses.

BRIEF DESCRIPTION OF THE DRAWINGS

In the accompanying drawings:

FIG. 2 illustrates an example of target output power of the power generation system according to embodiments;

DETAILED DESCRIPTION

First Embodiment

Figure 1:
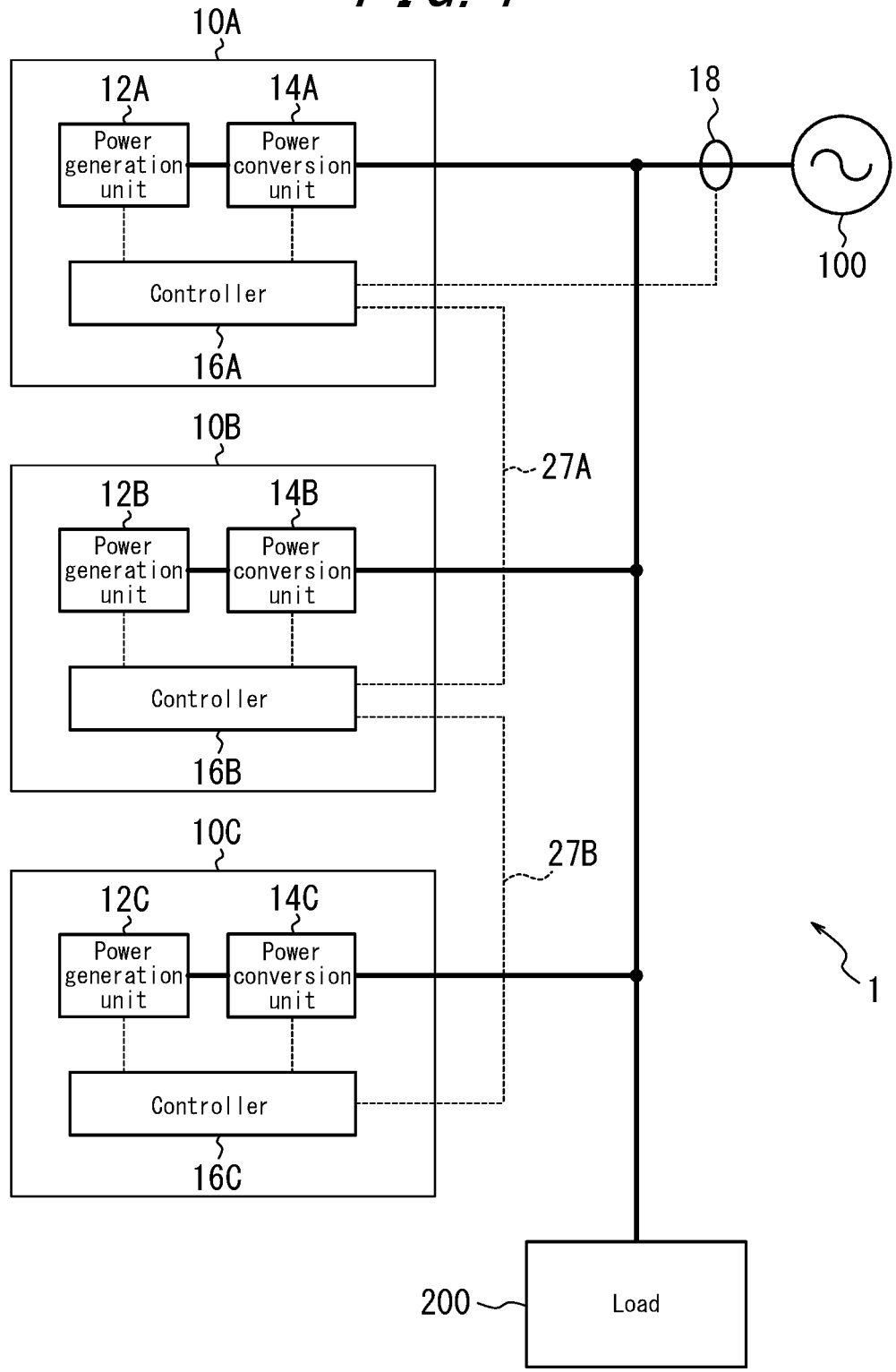
FIG. 1 is a block diagram illustrating a power generation system according to a first embodiment.

In FIG. 1, bold lines represent power flow paths, and broken lines represent flow of control signal and communicated information. A power generation system 1 according to the present embodiment is configured with power generation apparatuses 10A to 10C and a current sensor 18. The power generation apparatus 10A and the power generation apparatus 10B are coupled to each other via a communication line 27A, and the power generation apparatus 10B and the power generation apparatus 10C are coupled to each other via a communication line 27B. FIG. 1 also illustrates a grid 100 and a load 200 which are connected to the power generation system 1. The power generation apparatuses 10A to 10C of the present embodiment may be, for example, solid oxide fuel cell (SOFC) systems. As used herein, the term "grid" refers to a commercial power supply system.

The power generation system 1 interconnects with the grid 100 and supplies power to the load 200. The power generation system 1 controls output power to prevent a reverse power flow of a current (a current in a power-selling direction) detected by the current sensor 18 disposed between the power generation system 1 and the grid 100 and also to detect a slight forward power flow. At this time, most of power consumption of the load 200 is covered by the output power of the power generation system 1, and a slight amount of power is purchased from the grid 100.

The power generation apparatus 10A includes a power generation unit 12A for generating power, a power conversion unit 14A for converting the power from the power generation unit 12A, and a controller 16A for controlling the power generation unit 12A and the power conversion unit 14A.

The power generation unit 12A is, for example, a fuel cell module for generating power by receiving fuel gas supply and performs a load-following operation or a rated operation based on a control signal from the controller 16A.

The power conversion unit 14A converts the power generated by the power generation unit 12A and supplies thus converted power to the load 200. The power conversion unit 14A includes a DC/DC converter and an inverter. DC power from the power generation unit 12A is boosted or stepped down by the DC/DC converter, converted into AC power by the inverter, and then output to the load 200.

Note that, although in the present embodiment the power conversion unit 14A includes the DC/DC converter and the inverter, the power conversion unit 14A may include the DC/DC converter alone when the power generation unit 12A outputs the AC power.

The controller 16A includes a controller responsible for execution of a program and a memory for storing the program and various information. Here, the controller is one integrated circuit configured with a CPU (a central processing unit), an input-output circuit, and a timer circuit. The controller obtains information from the power generation apparatuses 10B and 10C, the DC/DC converter, the inverter, and the current sensor 18 and executes programs for controlling respective functional blocks. For example, the controller 16A controls the DC/DC converter and the inverter such that the power conversion unit 14A outputs AC 100V or 200V. Also, the controller 16A controls the inverter while communicating with the power generation apparatuses 10B and 10C, such that a phase of the AC power output from the power conversion unit 14A matches phases of the AC power respectively output from the power generation apparatuses 10B and 10C.

The power generation apparatus 10A functions as a main power generation apparatus in the power generation system 1. That is, the controller 16A of the power generation apparatus 10A obtains, from the current sensor 18, a current detected by the current sensor 18 and, based on a result of the detection, first calculates target total output power x of the power generation system 1. Next, the power generation apparatus 10A determines respective target output power of all of the power generation apparatuses and transmits, to the power generation apparatuses 10B and 10C, the respective target output power. The power generation apparatus 10A may communicate with the power generation apparatuses 10B and 10C via respective communication lines 28A and 27B by using a particular protocol. The communication lines 27A and 28B are in conformity with a serial communication standard such as RS-232C (Recommended Standard 232 version C) and USB (Universal Serial Bus). Also, the controller 16A controls the power generation unit 12A and the power conversion unit 14A in such a manner that output power of the power generation apparatus 10A meets the target output power of the power generation apparatus 10A.

The power generation apparatus 10B includes a power generation unit 12B for generating power, a power conversion unit 14B for converting the power from the power generation unit 12B, and a controller 16B for controlling the power generation unit 12B and the power conversion unit 14B. Similarly, the power generation apparatus 10C includes a power generation unit 12C for generating power, a power conversion unit 14C for converting the power from the power generation unit 12C, and a controller 16C for controlling the power generation unit 12C and the power conversion unit 14C.

Since the power generation units 12B and 12C have functions and roles the same as the power generation unit 12A, and the power conversion units 14B and 14C have functions and roles the same as the power conversion unit 14A, further descriptions of the power generation units 12B and 12C and the power conversion units 14B and 14C will be omitted.

The controller 16B receives the target output power from the power generation apparatus 10A and controls the power generation unit 12B and the power conversion unit 14B in such a manner that actual output power of the power generation apparatus 10B meets the target output power of the power generation apparatus 10B. Similarly, the controller 16C receives the target output power from the power generation apparatus 10A and controls the power generation unit 12C and the power conversion unit 14C in such a manner that actual output power of the power generation apparatus 10C meets the target output power of the power generation apparatus 10C.

FIG. 2 is a diagram illustrating an example of the respective target power of the power generation apparatuses 10A to 10C with respect to the target total output power x. The target total output power x is determined by the controller 10A of the power generation apparatus 10A based on current total output power of the power generation system 1 and the current detected by the current sensor 18. That is, the controller 16A first obtains information about the output power of the power generation apparatus 10B from the controller unit 16B and information about the output power of the power generation apparatus 10C from the controller unit 16C and then adds the output power of the power generation apparatus 10A to the output power of the power generation apparatuses 10B and 10C, thereby calculating the current total output power of the power generation system 1. Next, the controller 16A, from a current in a direction of a forward power flow detected by the current sensor 18, calculates power being purchased from the grid 100. Then, the controller 16A adds the power being purchased from the grid 100 to the current total output power of the power generation system 1, thereby calculating the power consumption of the load 200. Lastly, the controller 16A determines power less than the power consumption of the load 200 by a predetermined amount as the target total output power x. The predetermined amount is a value indicative of a margin of the power generation system 1 with respect to the reverse power flow and may be, for example, approximately 50 W.

As illustrated in FIG. 2, when the target total output power x is 3.0 [kW] or less, the controller 16A stops outputs of the power generation apparatuses 10B and 10C while allowing the power generation apparatus 10A alone to generate power and supply the power to the load 200. When the target total output power x is greater than 3.0 [kW] and 6.0 [kW] or less, the controller 16A allows the power generation apparatus 10B, in addition to the power generation apparatus 10A, to generate power in such a manner that the power generation apparatus 10B supplies predetermined power (1.0 to 3.0 [kW]). When the target total output power x is greater than 6.0 [kW], the controller 16A allows the power generation apparatus 10C, in addition to the power generation apparatuses 10A and 10B, to generate power such that the power generation apparatus 10C supplies predetermined power (3.0 [kW]).

Note that the respective target output power of the power generation apparatuses 10A to 10C are provided in FIG. 2 for illustrative purpose only and may be determined by various methods. The controller 16A may determine priority orders of the power generation apparatuses to generate power based on, for example, various specifications of the power generation units 12A to 12C. Or, the controller 16A may determine the priority orders of the power generation apparatuses to generate power based on respective operating times of the power generation apparatuses 10A to 10C.

The current sensor 18 detects the current flowing between the power generation system 1 and the grid 100. In Japan, since selling power generated by the power generation system 1 configured with a fuel cell is regulated, when the current sensor 18 detects the reverse power flow (a current in a power-selling direction) to the grid 100, the power generation system 1 stops outputting. While the current sensor 18 detects the forward power flow, the power generation system 1 considers that the power generation system 1 can supply power to the load 200 by itself and generates power by performing the load-following operation or the rated operation.

The load 200 is a load for operating on a single-phase AC 100V or 200V used in a house. Examples of the load 200 include electrical appliances which should avoid power outage as much as possible such as a refrigerator, an emergency light, a hot water supply system, and a home network server, and general home loads such as a hair dryer, a home video game, and a music audio system.

Note that, although in the present embodiment the power generation system 1 is configured to output the single-phase 200 V or the single-phase 100 V to the load 200, the disclosure is not limited to this configuration. Since a three-phase three-line 200 V is popularly used for a commercial refrigerator and a commercial air conditioner as well as for driving a motor in a factory, inverters for converting power into the three-phase three-wire 200 V may be respectively provided in the power conversion units 14A to 14C.

Although in the present embodiment the load 200 connected to the power generation system 1 is assumed to be an electrical appliance which may be used in Japan, the load 200 may also be appropriately changed in consideration of the user of an electric appliance which may be used outside Japan. For example, an inverter capable of outputting AC 220 V to 240 V may be respectively provided to the power conversion units 14A to 14C to allow connection of an electric appliance which may be used in Asia, Oceania, and Europe.

(Control of Main Power Generation Apparatus)

Figure 3:
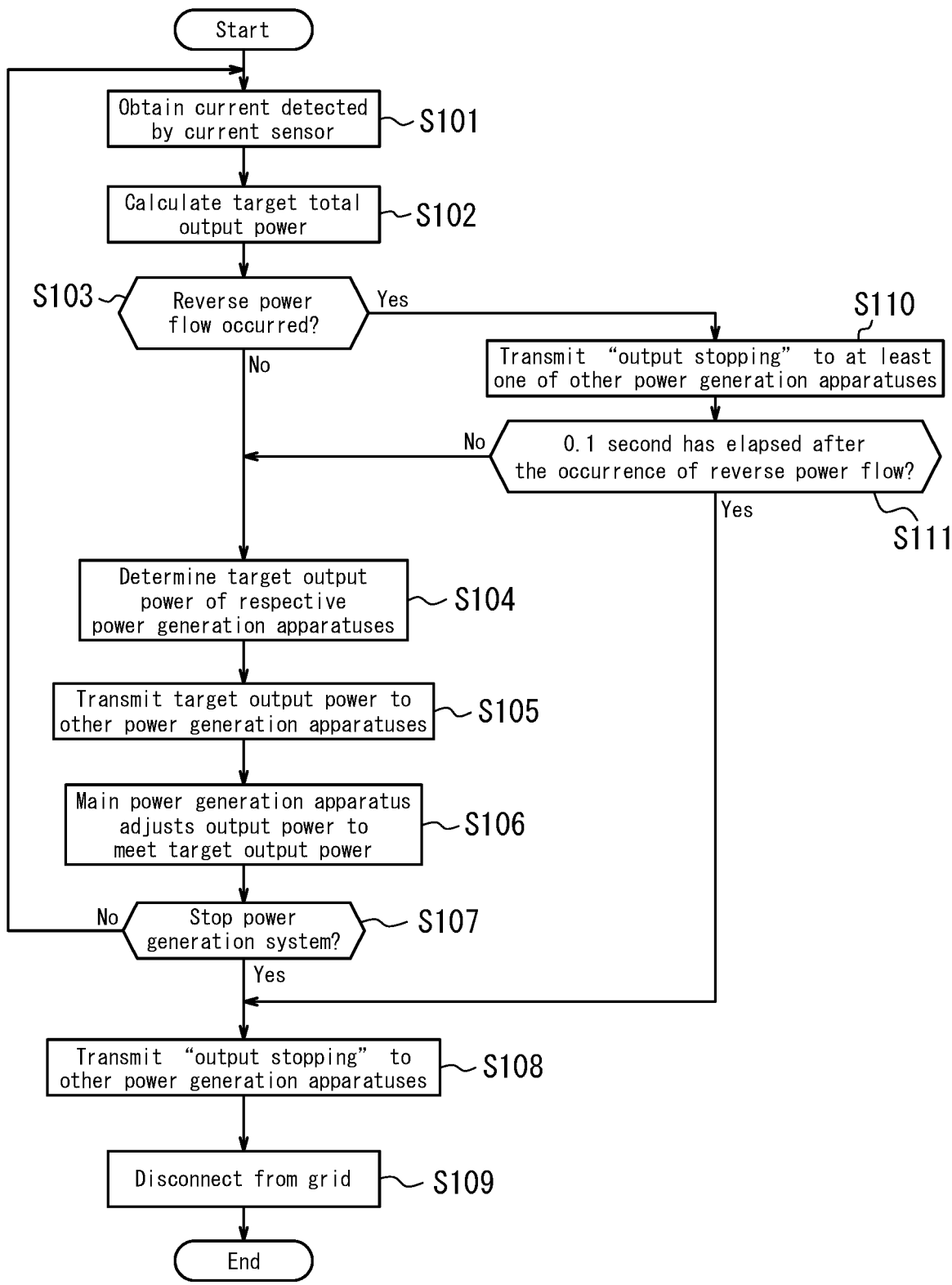
FIG. 3 illustrates a control flow of a main power generation apparatus of the power generation system according to the first embodiment.

FIG. 3 is a diagram illustrating a control flow of the power generation apparatus 10A serving as the main power generation apparatus of the power generation system 1 of the present embodiment. First, upon start of the operation of the power generation system 1, the controller 16A of the power generating apparatus 10A obtains, from the current sensor 18, the current detected by the current sensor 18 (step S101). Next, the controller 16A obtains the output power of the power generation apparatus 10B from the controller 16B and the output power of the power generation apparatus 10C from the controller 16C and adds the output power of the power generation apparatus 10A to the output power of the power generation apparatuses 10B and 10C, thereby calculating the current total output power of the power generation system 1. Subsequently, the controller 16A, to the current total output power of the power generation system 1, adds the power purchased from the grid 100 calculated from the current detected by the current sensor 18, thereby calculating the power consumption of the load 200. Then, the controller 16A calculates the power less than the power consumption of the load 200 by the predetermined amount and determines the power thus calculated as the target total output power x (step S102).

Next, the controller 16A determines, based on the current detected by the current sensor 18, whether the reverse power flow has occurred (step S103). When determining that the reverse power flow has not occurred, the controller 16A, by using the target total output power x calculated at step S102 and a table illustrated in FIG. 2, determines the respective target output power of the power generation apparatuses 10A to 10C (step S104). Note that, instead of using fixed values as illustrated in FIG. 2, the respective priority orders and target output power of the power generation apparatuses may be determined in consideration of factors such as various specifications of the power generation units 12A to 12C and the respective operating times of the power generation apparatuses 10A to 10C.

After determining the target output power at step S104, the controller 16A transmits the respective target output power thus determined to the power generation apparatuses 10B and 10C in a corresponding manner (step S105). Then, the controller 16A controls the power generation unit 12A and the power conversion unit 14A in such a manner that the output power of the power generation apparatus 10A meets the target output power (step S106).

The controller 16A, after completing the step S106, determines whether a stopping instruction of the power generation system 1 is in execution (step S107). When the stopping instruction is not in execution, the controller 16A returns to step S101 to continue the control.

On the other hand, when the controller 16A determines that the stopping instruction of the power generation system 1 is in execution, the controller 16A transmits an "output stopping" command to the power generation apparatuses 10B and 10C (step S108). Then, the controller 16A disconnects the power generation apparatus 10A from the grid 100 (step S109) and ends the control.

When the controller 16A determines at step S103 that the reverse power flow has occurred, the controller 16A transmits the "output stopping" command to at least one of the power generation apparatus 10B and the power generation apparatus 10C (step S110). At step S110, the controller 16A, based on a magnitude of the reverse power flow detected by the current sensor 18, determines which power generation apparatus should stop the output. That is, when a slight reverse power flow is detected, one of the power generation apparatus 10B and the power generation apparatus 10C needs to stop, while, when the reverse power flow in a great amount is detected, the controller 16A controls to stop a plurality of power generation apparatuses. Next, the controller 16A determines whether 0.1 second has elapsed after the occurrence of the reverse power flow (step S111). The controller 16A, when the reverse power flow is detected, controls to stop at least one of the power generation apparatus 10B and the power generation apparatus 10C so as to eliminate the reverse power flow within 0.1 second. When the controller 16A determines that 0.1 second has not elapsed after the occurrence of the reverse power flow, the controller 16A proceeds to step S104 to determine the respective target output power of the power generation apparatuses. Here, the controller 16A determines the target output power of the power generation apparatus to which the "output stopping" command is not transmitted. On the other hand, when the controller 16A determines at step S111 that 0.1 second has elapsed after the occurrence of the reverse power flow, the controller 16A determines that it is difficult to adjust the output power to eliminate the reverse power flow and transmits the "output stopping" command to the power generation apparatus to which the "output stopping" is not transmitted (step S108). Then, the controller unit 16A controls to stop the power output from the power converter unit 14A of the power generation apparatus 10A, disconnects the power generation apparatus 10A from the gird 100 (step S109), and then ends the control.

(Control of Supplemental Power Generation Apparatus)

Figure 4:
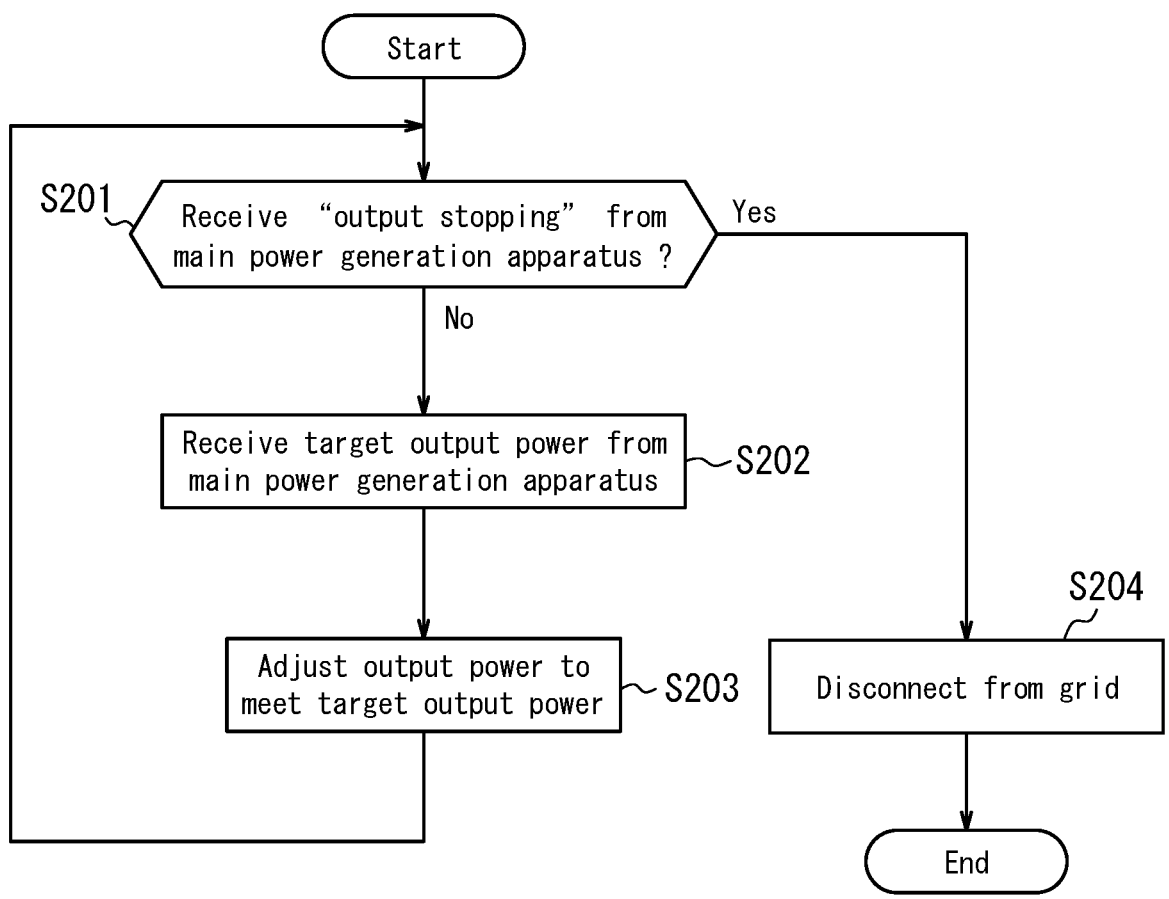
FIG. 4 illustrates a control flow of a supplemental power generation apparatus of the power generation system according to the first embodiment.

FIG. 4 is a diagram illustrating a control flow of the power generation apparatuses 10B and 10C serving as supplemental power generation apparatuses of the power generation system 1 of the present embodiment. First, upon start of the operation of the power generation system 1, the controller 16B of the power generation apparatus 10B and the controller 16C of the power generation apparatus 10C determine whether the "output stopping" command has been received from the main power generation apparatus (step S201). Then, when determining that the "output stopping" command has not been received, the controllers 16B and 16C receive the respective target output power from the power generation apparatus 10A serving as the main generation apparatus (step S202).

After receiving the target output power from the power generation apparatus serving as the main power generation apparatus at step S202, the controller B controls the power generation unit 12B and the power conversion unit 14B to adjust the output power of the power generation apparatus 10B to meet the target output power. Similarly, after receiving the target output power from the power generation apparatus serving as the main power generation apparatus at step S202, the controller 16C controls the power generation unit 12C and the power conversion unit 14C to adjust the output power of the power generation apparatus 10C to meet the target output power (step S203). After completing execution of step S203, the controllers 16B and 16C return to step S201 and repeat the above control until receiving the "output stopping" command.

On the other hand, when the controllers 16B and 16C determine at step S201 that the "output stopping" command has been received from the main power generation apparatus, the controller 16B stops the power output from the power conversion unit 14B of the power generation apparatus 10B, and the controller 16C stops the power output from the power conversion unit 14C of the power generation apparatus 10C. Then, the controllers 16B and 16C respectively disconnect the power generation apparatuses 10B and 10C from the grid 100 (step S204) and ends the control.

Although in the present embodiment the communication lines 27A and 27B are used for the communication between the power generation apparatuses 10A, 10B, and 10C, radio communications may be employed instead.

Also, in the present embodiment the power generation apparatuses 10A, 10B, and 10C include the respective controllers 16A, 16B, and 16C which exchange information with one another by using a communication means and thereby perform cooperative operations of the power generation apparatuses 10A to 10C. However, the disclosure is not limited to this configuration, i.e., the power generation apparatus 10A serving as the main power generation apparatus alone may include the controller 16A which controls the power generation apparatuses 10B and 10C by directly communicating with the power generation unit 12B and the power conversion unit 14B of the power generation apparatus 10B and also with the power generation unit 12C and the power conversion unit 14C of the power generation apparatus 10C.

Also, although in the present embodiment the power generation units 12A to 12C output the DC power and the power conversion units 14A to 14C convert the DC power into the AC power, the disclosure is not limited to this configuration. That is, at least one of the power generation units 12A to 12C may output the AC power.

Also, although in the present embodiment the power generation apparatus 10A serving as the main power generation apparatus performs all operations including the detection of the reverse power flow and the determination on the respective target output power of the power generation apparatuses 10A to 10C, the disclosure is not limited to this configuration. For example, the power generation apparatus 10B may detect the reverse power flow, and the power generation apparatus 10A may obtain a result of the detection through the communication and determine the respective target output power of the power generation apparatuses 10A to 10C.

As described above, in the present embodiment the power generation system 1 includes one current sensor: the current sensor 18. Also, the power generation apparatus 10A serving as the main power generation apparatus determines whether the reverse power flow has occurred from the current detected by the current sensor 18 and, based on a result of the determination, determines the respective target output power of the power generation apparatuses 10A to 10C. This configuration helps solve a problem that a plurality of current sensors cannot be accommodated in a distribution board. Also, since the power generation apparatus 10A serving as the main power generation apparatus determines the respective target output power of the power generation apparatuses 10A to 10C, the shortage of the power supply caused when the power generation apparatuses 10A to 10C simultaneously reduce or stop the power output in response to the occurrence of the reverse power flow may be eliminated.

Next, a second embodiment of the disclosure will be described in detail with reference to the drawings.

Second Embodiment

Figure 5:
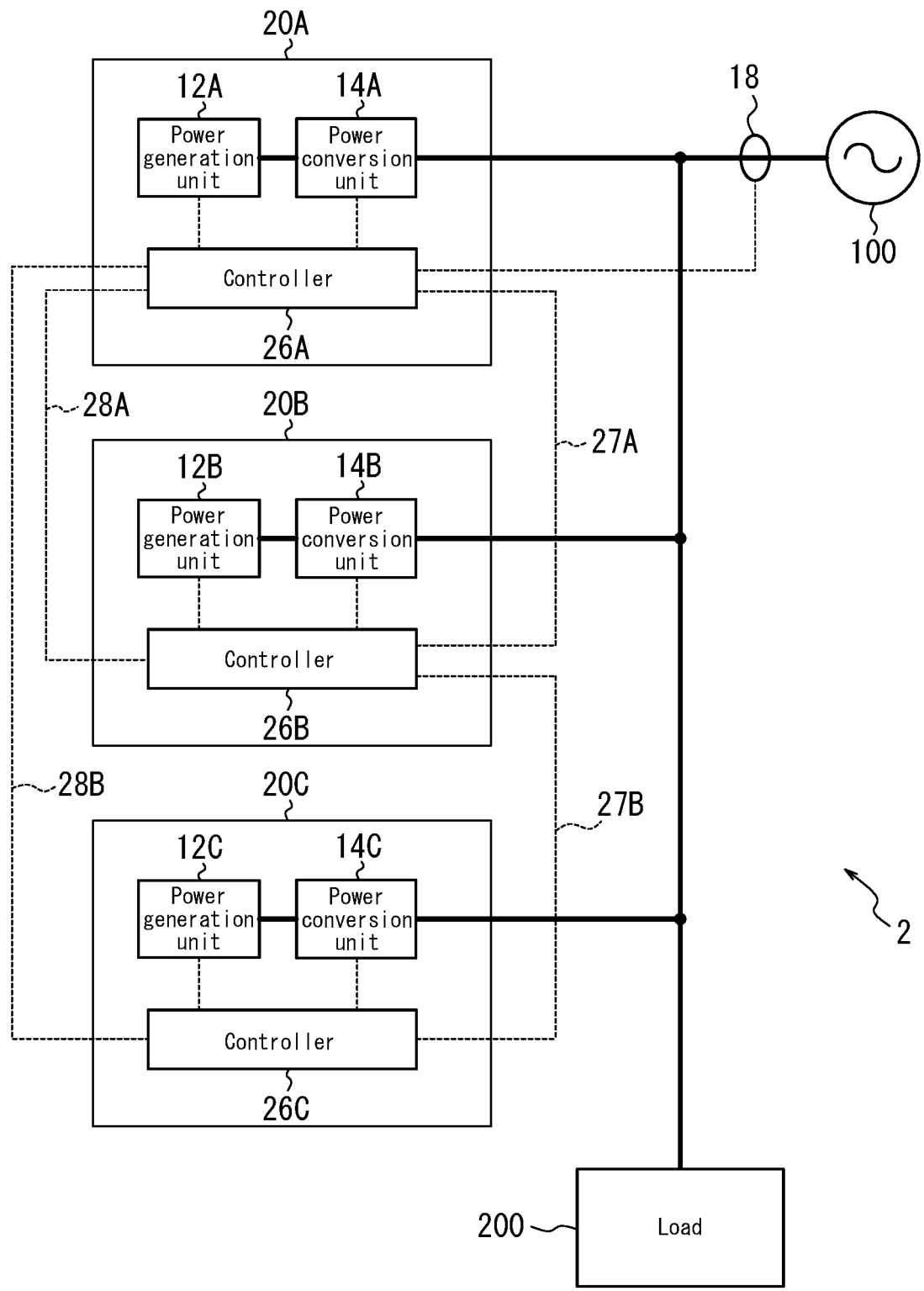
FIG. 5 is a block diagram illustrating a power generation system according to a second embodiment.

FIG. 5 is a block diagram illustrating a schematic configuration of a power generation system 2 according to a second embodiment of the disclosure. In FIG. 5 also, bold lines represent the power flow paths, and narrow lines represent the flow of the control signal and the communicated information. The power generation system 2 according to the present embodiment is configured with the power generation apparatuses 20A to 20C and the current sensor 18. The power generation apparatus 20A and the power generation apparatus 20B are coupled to each other via a first communication line 27A, and the power generation apparatus 20B and the power generation apparatus 20C are coupled to each other via a first communication line 27B. Further, the power generation apparatus 20A and the power generation apparatus 20B are coupled to each other via a second communication line 28A, and the power generation apparatus 20A and the power generation apparatus 20C are coupled to each other via a second communication line 20B.

Note that the configuration of hardware of the power generation system 2 is not greatly different from the configuration of the power generation system 1 of the first embodiment, other than that the power generation apparatuses are coupled to each other via the second communication lines 28A and 28B in addition to the first communication lines 27A and 27B. Therefore, common descriptions will be omitted.

The power generation apparatus 20A is coupled to the power generation apparatus 20B and the power generation apparatus 20C via the second communication line 28B and the second communication line 28C, respectively, in addition to the first communication lines. Unlike the first communication lines 27A and 27B for connecting the power generation apparatuses adjacent to each other, the second communication line 28A and the second communication line 28B respectively connect between the power generation apparatus 20A serving as the main power generation and the power generation apparatus 20B and between the power generation apparatus 20A and the power generation apparatus 20C. Communications via the second communication lines 28A and 28B may be controlled to be ON/OFF by switchover between two values: for example, HIGH/LOW. In this case, for example, a HIGH signal output by the power generation apparatus 20A may be 3.3 V, and a LOW signal may be 0 V. The power generation apparatus 20B may be turned on upon application of a HIGH voltage to the second communication line 28A by the power generation apparatus 20A and may be turned off upon application of a LOW voltage to the second communication line 28A. Similarly, the power generation apparatus 20C may be turned on upon application of the HIGH voltage to the second communication line 28B by the power generation apparatus 20A and may be turned off upon application of the LOW voltage to the second communication line 28B. Unlike a serial communication by the first communication lines 27A and 27B, since the use of the second communication lines 28A and 28B allows direct control to turn on/off the power generation apparatuses 20B and 20C based on the voltage, a stopping operation may be carried out without delay.

(Control of Main Power Generation Apparatus)

Figure 6:
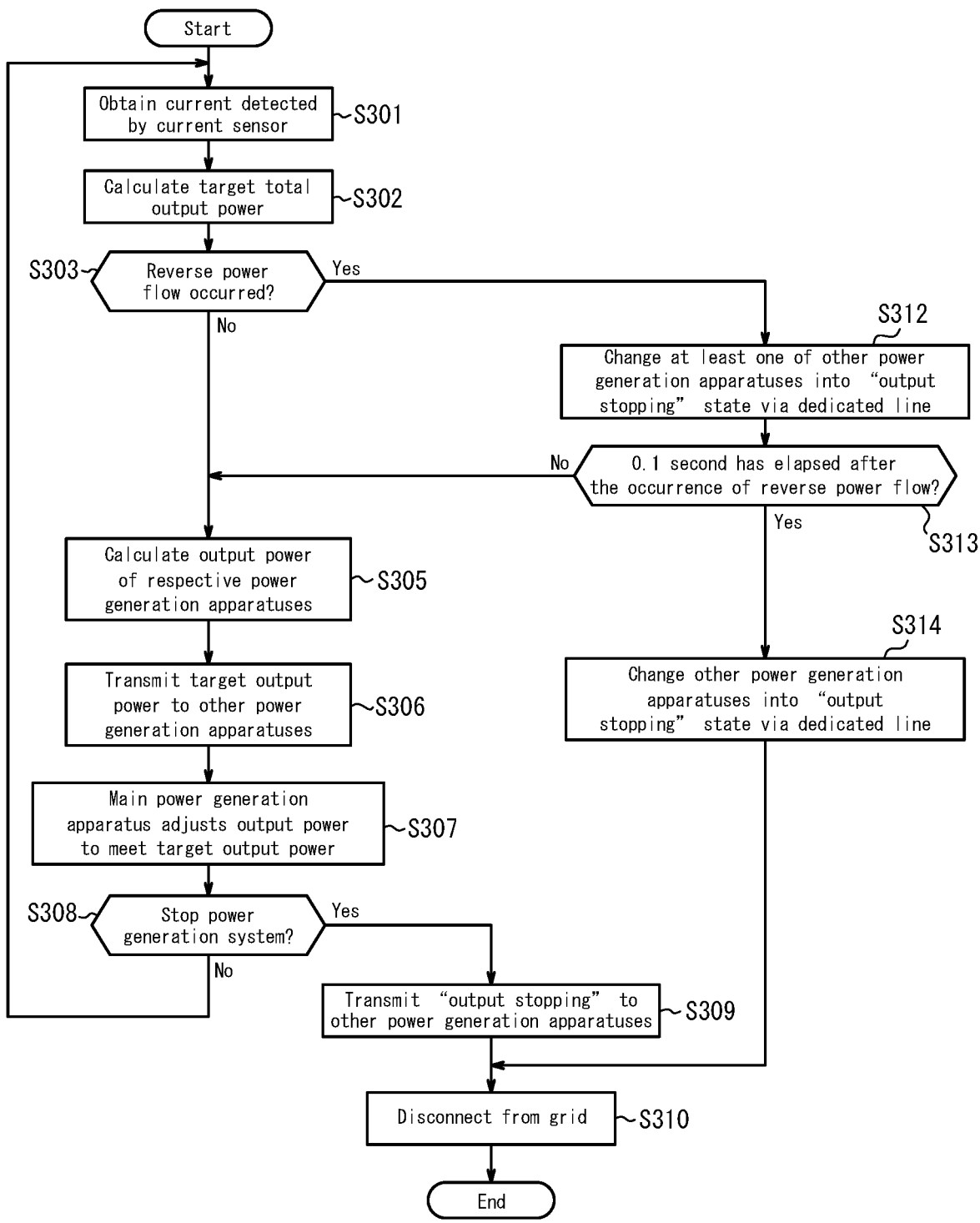
FIG. 6 illustrates a control flow of a main power generation apparatus of the power generation system according to the second embodiment.

FIG. 6 is a diagram illustrating a control flow of the power generation apparatus 20A serving as the main power generation apparatus of the power generation system 2 of the present embodiment. First, upon start of the operation of the power generation system 2, the controller 26A of the power generating apparatus 20A obtains, from the current sensor 18, the current detected by the current sensor 18 (step S301). Next, the controller 26A obtains the output power of the power generation apparatus 20B from the controller 26B and the output power of the power generation apparatus 20C from the controller 26C and adds the output power of the power generation apparatus 20A to the output power of the power generation apparatuses 20B and 20C, thereby calculating the current total output power of the power generation system 2. Then, the controller 26A, to the current total output power of the power generation system 2, adds the power being purchased from the grid 100 calculated from the current detected by the current sensor 18, thereby calculating the power consumption of the load 200. Then, the controller 26A calculates the power less than the power consumption of the load 200 by the predetermined amount, and determines the power thus calculated as the target total output power x (step S302).

Next, the controller 26A determines whether the reverse power flow has occurred based on the current detected by the current sensor 18 (step S303). When determining that the reverse power flow has not occurred, the controller 26A, by using the target total output power calculated at step S302 and the table illustrated in FIG. 2, determines the respective target output power of the power generation apparatuses 20A to 20C (step S305). Note that, instead of using the fixed value as illustrated in FIG. 2, the priority orders and the respective target output power of the power generation apparatuses may be determined based on factors such as various specifications of the power generation units 12A to 12C and the respective operating times of the power generation apparatuses 20A to 20C.

After completing the determination on the respective target output power of the power generation apparatuses 20A to 20C at step S305, the controller 26A transmits the respective target output power thus determined to the power generation apparatuses 20B and 20C in the corresponding manner (step S306). Then, the controller 26A controls the power generation unit 12A and the power conversion unit 14A to adjust the output power of the power generation apparatus 20A to meet the target output power (step S307).

The controller 26A, after completing step S307, determines whether the stopping instruction of the power generation system 2 is in execution (step S308). When the stopping instruction is not in execution, the controller 26A returns to step S301 to continue the control.

On the other hand, when the controller 16A determines that the stopping instruction of the power generation system 2 is in execution, the controller 26A transmits the "output stopping" command to the power generation apparatuses 20B and 20C (step S309). Then, the controller 26A disconnects the power generation apparatus 20A from the grid 100 (step S310) and ends the control.

When the controller 26A determines at step S303 that the reverse power flow has occurred, the controller 26A changes at least one of the power generation apparatus 20B and the power generation apparatus 20C into an "output stop" state (step S312). The controller 26A, in order to change the power generation apparatus 20B and/or the power generation apparatus 20C into the "output stopping" state based on the magnitude of the reverse power flow detected by the current sensor 18, changes the second communication line 28A and/or the second communication line 28B into a LOW state, in a corresponding manner.

Next, the controller 26A determines whether 0.1 second has elapsed after the occurrence of the reverse power flow (step S313). The controller 26A, when the reverse power flow is detected, controls to stop at least one of the power generation apparatus 20B and the power generation apparatus 20C such that the reverse power flow will be eliminated within 0.1 second. The controller 26A, when determining that 0.1 second has not elapsed after the occurrence of the reverse power flow, proceeds to step S305 to determine the respective target output power of the respective power generation apparatuses. Here, the controller 26A determines the target output power of the power generation apparatus to which the "output stopping" command is not transmitted at step S312. On the other hand, when the controller 26A determines at step S313 that 0.1 second has elapsed after the occurrence of the reverse power flow, the controller 26A determines that it is difficult to adjust the output power to eliminate the reverse power flow and changes the power generation apparatus 20B and/or the power generation apparatus 20C, which have/has not been changed into the "output stopping" state, into the "output stopping" state (step S314). Then, the controller unit 26A controls to stop the power output from the power converter unit 14A of the power generation apparatus 20A, disconnects the power generation apparatus 20A from the gird 100 (step S310), and then ends the control.

Note that, although in the present embodiment the controller 26A, when the reverse power flow occurs, controls to stop the respective outputs of the power generation apparatus 20B and the power generation apparatus 20C via respective dedicated lines, the controller 26A may use the dedicated lines for normal adjustment to meet the target output power. That is, in a situation where the power consumption of the load, i.e., the target total output power decreases and, even after 0.1 second from the calculation of the target total output power (step S102), actual total output power exceeds the target total output power for a reason such as delay in the communication, the controller 26A may change at least one of the power generation apparatus 20B and the power generation apparatus 20C into the "output stopping" state via the dedicated line.

(Control of Supplemental Power Generation Apparatus)

Figure 7:
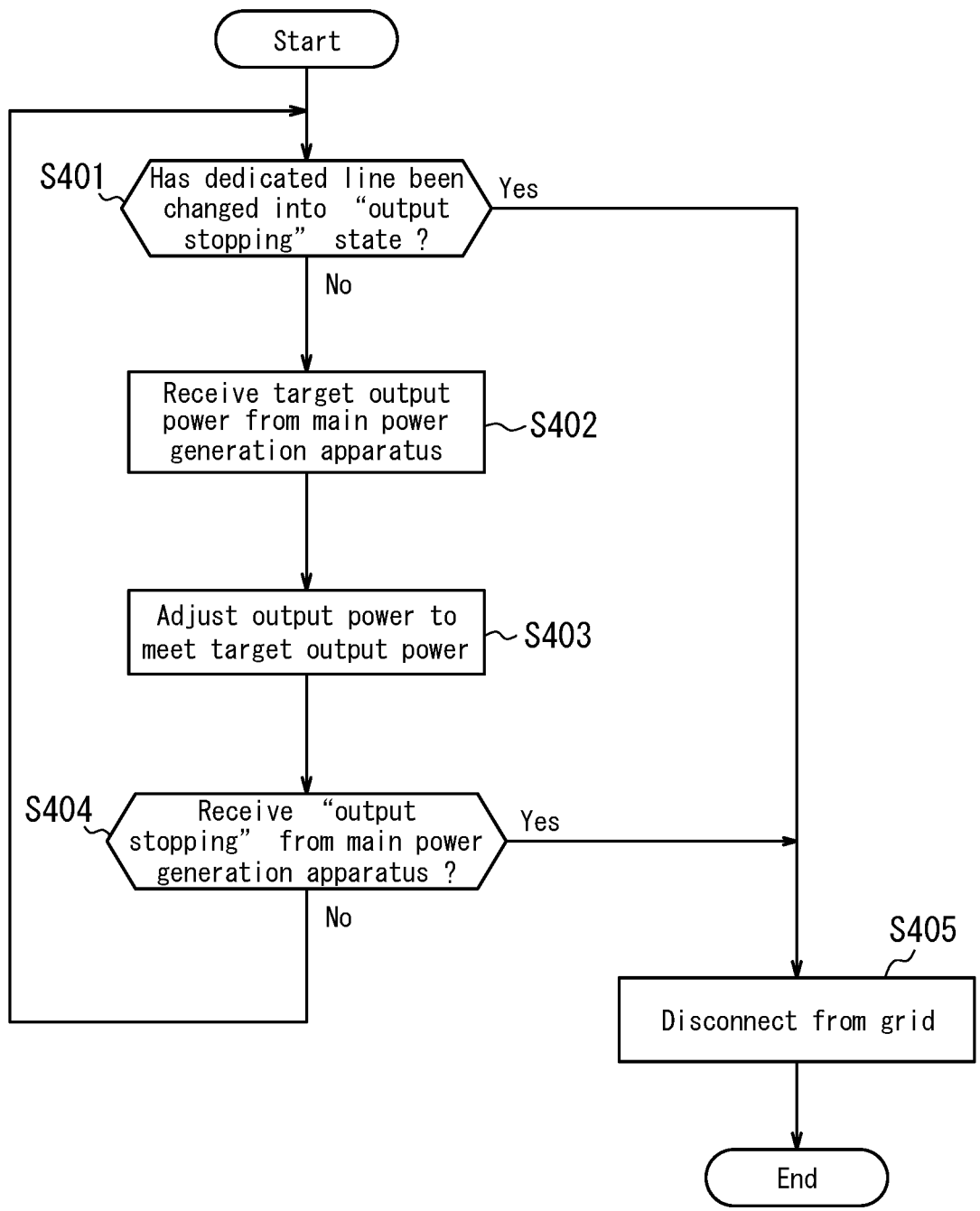
FIG. 7 illustrates a control flow of a supplemental power generation apparatus of the power generation system according to the second embodiment.

FIG. 7 is a diagram illustrating a control flow of the power generation apparatuses 20B and 20C serving as the supplemental power generation apparatuses of the power generation system 2 of the present embodiment. First, upon start of the operation of the power generation system 2, the controller 26B of the power generation apparatus 20B and the controller 26C of the power generation apparatus 20C determine whether the respective voltages of the second communication line 20A and the second communication line 28B have been changed to a LOW level corresponding to the "output stopping" state (step S401). Then, when determining that the voltages have not been changed to the "output stopping" state, the controller 26B and the controller 26C receive the respective target output power from the power generation apparatus 20A serving as the main generation apparatus (step S402).

Upon reception of the target output power from the power generation apparatus 20A serving as the main power generation apparatus at step S402, the controller 26B controls the power generation unit 12B and the power conversion unit 14B in such a manner that the output power of the power generation apparatus 20B meets the target output power (step S403). Similarly, upon reception of the target output power from the power generation apparatus 20A serving as the main power generation apparatus at step S402, the controller 26C controls the power generation unit 12C and the power conversion unit 14C such that the output power of the power generation apparatus 20C meets the target output power (step S403). After execution of step S403, the controllers 26B and 26C determine whether the "output stopping" command has been received via the first communication lines 20A and 28B from the power generation apparatus 20A (step S404). When the controllers 26B and 26C determine that the "output stopping" command has not been received, the controllers 26B and 26C return to step S401 and continue the control described above until receiving the "output stopping" command.

When the controller 26B and the controller 26C determine at step S404 that the "output stopping" command has been received, the controller 26B and the controller 26C stop the output power from the power conversion unit 14B of the power generation apparatus 20B and the power conversion unit 14C of the power generation apparatus 20C, respectively, disconnect the power generation apparatus 20B and the respective power generation apparatus 20C, respectively, from the grid 100 (step S405), and then end the control.

On the other hand, when the controller 26B and the controller 26C determine at step S401 that the voltages of the second communication lines 28A and 28B are changed into the "output stopping" state, the controller 26B and the controller 26C stop the power output from the power conversion unit 14B of the power generation apparatus 20B and the power output from the power conversion unit 14C of the power generation apparatus 20C, respectively, disconnect the power generation apparatus 20B and the respective power generation apparatus 20C, respectively, from the grid 100 (step S405), and then end the control.

According to the present embodiment, as described above, a second communication means is provided and, when the reverse power flow occurs, or when the target total output power rapidly decreases, the respective power outputs of the power generation apparatuses 20B and 20C are controlled to stop via the second communication means. This configuration can prevent a delay in the stopping operation of the power output due to the delay in the communication and reliably prevent the occurrence of the reverse power flow.

Third Embodiment

Figure 8:
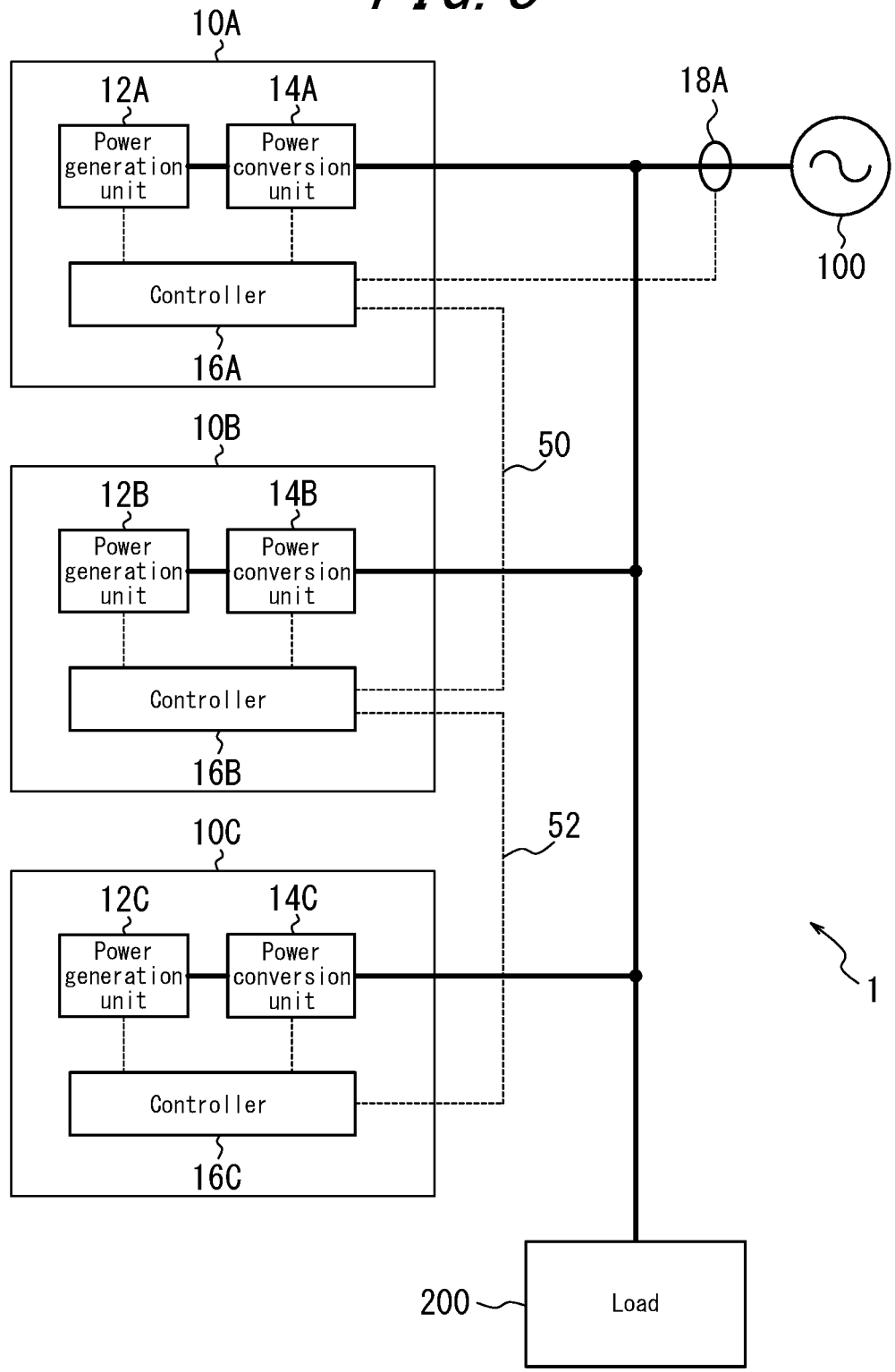
FIG. 8 is a functional block diagram schematically illustrating a power generation system configured with power generation apparatuses according to a third embodiment.

FIG. 8 is a functional block diagram schematically illustrating a power generation system configured with a plurality of power generation apparatuses according to a third embodiment.

As illustrated in FIG. 8, the power generation system 1 configured with the power generation apparatuses according to the third embodiment includes the power generation apparatuses 10A, 10B, and 10C. FIG. 8 illustrates an example in which the power generation system 1 is configured with three power generation apparatuses 10A to 10C serving as distributed power sources. However, the power generation system 1 of the present embodiment may be configured with any number of power generation apparatuses having configurations similar to those of the power generation apparatuses 10A to 10C. Hereinafter, descriptions of an element and a function unit which are conventionally well-known will be appropriately simplified or omitted.

As illustrated in FIG. 8, the power generation apparatus 10A is configured with the power generation unit 12A, the power conversion unit 14A, and the controller 16A. In FIG. 8, bold lines represent the power flow paths, and broken lines represent the flow of the control signal and the communicated information.

The power generation unit 12A interconnects with the grid 100 and generates power to be supplied to the load 200. The grid 100 may be a general commercial power supply system. The power generation unit 12A may be, for example, a fuel cell of various types such as a polymer electrolyte fuel cell (PEFC) and the solid oxide fuel cell (SOFC). In the present embodiment, especially, the power generation unit 12A preferably generates power that cannot be sold to the grid, i.e., the power that cannot be flown backward.

As used herein, the term "power that cannot be flown backward" refers to, for example, electric power which is generated based on energy supplied from an infrastructure such as power generated by the fuel cell and currently not authorized to sell in Japan. In the present embodiment, therefore, the power generation unit 12A is preferably different from, for example, a power generation unit of the solar cell for performing solar photovoltaic generation to generate power which can be sold to the grid. Hereinafter, an example in which the power generation unit 12A is the SOFC will be described. Note that, however, the power generation unit of the disclosure is not limited to the SOFC but may typically be a power generation unit of various types having the fuel cell. In particular, the power generation unit 12A is preferably a distributed power source which cannot flow power backward.

The power generation unit 12A configured with the SOFC may generate power by using a fuel cell power generation apparatus which causes electrochemical reaction of gases such as hydrogen and oxygen supplied from the outside, and supply power thus generated. In the present embodiment, although the power generation unit 12A starts operating upon reception of the power from the grid 100, after starting the operation, the power generation apparatus 12A may operate without receiving the power from the grid, i.e., perform an independent operation. In the present embodiment, the power generation unit 12A appropriately includes other function units such as a reformer unit for allowing the independent operation. In the present embodiment, since the power generation unit 12A may be a generally well-known fuel cell, a further detailed description of the fuel cell will be omitted.

The power generated by the power generation unit 12A may be supplied to, via the power conversion unit 14A, the load 200, which may be a load of various types to consume power. Here, although in a house or the like the power output from the power generation apparatus 10A is supplied to the load via the distribution board or the like, such an element is omitted here. The load 200 may be an apparatus of various types such as an electric appliance to receive the power from the power generation system 1 and to be used by a user. Although the load 200 is illustrated as one element in FIG. 8, the number of loads 200 is not limited thereto.

The power conversion unit 14A converts the DC power generated by the power generation unit 12A into the AC power. In particular, the power conversion unit 14A boosts or steps down the DC power generated by the power generation unit 12A by using the DC/DC converter and then converts the DC power into the AC power by using the DC/AC inverter. Since the power conversion unit 14A may be a general inverter and may have a well-known configuration, a detailed description of the power conversion unit 14A will be omitted.

The controller 16A controls and manages the power generation apparatus 10A in its entirety including each function unit thereof. The controller unit 16A may be, for example, a microcontroller or the processor (CPU). Also, the controller 16A is assumed to include a memory for storing various programs and information. The memory also stores algorithm used for data analysis and various arithmetic processing carried out by the controller 16A, as well as various reference tables including a look-up table (LUT). In the present embodiment, especially, the controller 16A controls the output of the power generated by the power generation unit 12A. To perform this control, the controller 16A may control, for example, the power generation of the power generation unit 12A and the output of the power conversion unit 14A. As illustrated in FIG. 8, therefore, the controller 16A is coupled to the power generation unit 12A and the power conversion unit 14A via respective control lines. The following is a description mainly about an operation of the control unit 16A associated with a unique control according to the present embodiment.

The power generation apparatus 10B includes the power generation unit 12B which interconnects with the grid 100 and supplies the power to the load 200, the power conversion unit 14B for converting the DC power generated by the power generation unit 12B into the AC power, and the controller 16B for controlling the output of the power generated by the power generation unit 12B. Similarly, the power generation apparatus 10C includes the power generation unit 12C which interconnects with the grid 100 and supplies the power to the load 200, the power conversion unit 14C for converting the DC power generated by the power generation unit 12C into the AC power, and the controller 16C for controlling the output of the power generated by the power generation unit 12C.

As illustrated in FIG. 8, the power generation apparatuses 10A, 10B, and 10C may be configured similarly. However, the power generation apparatuses 10A, 10B, and 10C are not limited to have similar configurations but may have different configurations. In the present embodiment, the power generation apparatuses 10A, 10B, and 10C are required to simply interconnect with the grid 100 and be capable of controlling the output of the power to be supplied to the load 200. Therefore, the power generation system 1 is configured with the power generation apparatuses 10A, 10B, and 10C which interconnect with the grid 100 and are capable of controlling the output of the power to be supplied to the load 200.

As illustrated in FIG. 8, also, in the power generation system 1, the output of the power from the power generation apparatus 10A is combined with the outputs of the power generated by the power generation apparatuses 10B and 10C. Accordingly, each of the power generation apparatuses 10A, 10B, and 10C may be the distributed power source. Although in FIG. 8 the DC power generated by the power generation apparatuses 10A, 10B, and 10C are combined together after being converted into the AC power, the power generation system 1 of the present embodiment is not limited to this configuration. The DC power generated by the power generation apparatuses 10A, 10B, and 10C may be combined together without being converted.

As illustrated in FIG. 8, further, in the power generation system 1, the power generation apparatus 10A is coupled to the current sensor 18A. The current sensor 18A may be, for example, a CT (Current Transformer). However, the current sensor 18A may be any element as long as being capable of detecting the current.

The current sensor 18A is capable of detecting the reverse power flow of the power output from the power generation system 1 and flowing to the grid 100. Therefore, as illustrated in FIG. 8, the current sensor 18A is disposed at a position capable of detecting the power output from the power generation apparatuses 10A to 10C flowing to the grid 100 after supplied to the load 200. According to the present embodiment, that is, the current sensor 18A detects the current flowing between the power generation apparatus 10A and other power generation apparatus(es) (10B and/or 10C) coupled to the power generation apparatus 10A and the grid 100. Upon detection of the current, the current sensor 18A directly or indirectly notifies the control unit 16A of the current via a wired or wireless communication. The controller 16A may calculate the reverse power flow from the current detected by the current sensor 18A.

Further, in the power generation system 1 of the present embodiment, as illustrated in FIG. 8, the controller 16A of the power generation apparatus 10A and the controller 16B of the power generation apparatus 16B are coupled to each other via the control line 50. Also, the controller 16B of the power generation apparatus 10B and the controller 16C of the power generation apparatus 16C are coupled to each other via the control line 52. The control lines 50 and 52 may be wired or wireless lines. However, when the control lines 50 and 52 are the wired lines connecting between input terminals and output terminals of the power generation apparatuses 10A to 10C as described later, the configuration of the power generation system 1 becomes simple.

Figure 9:
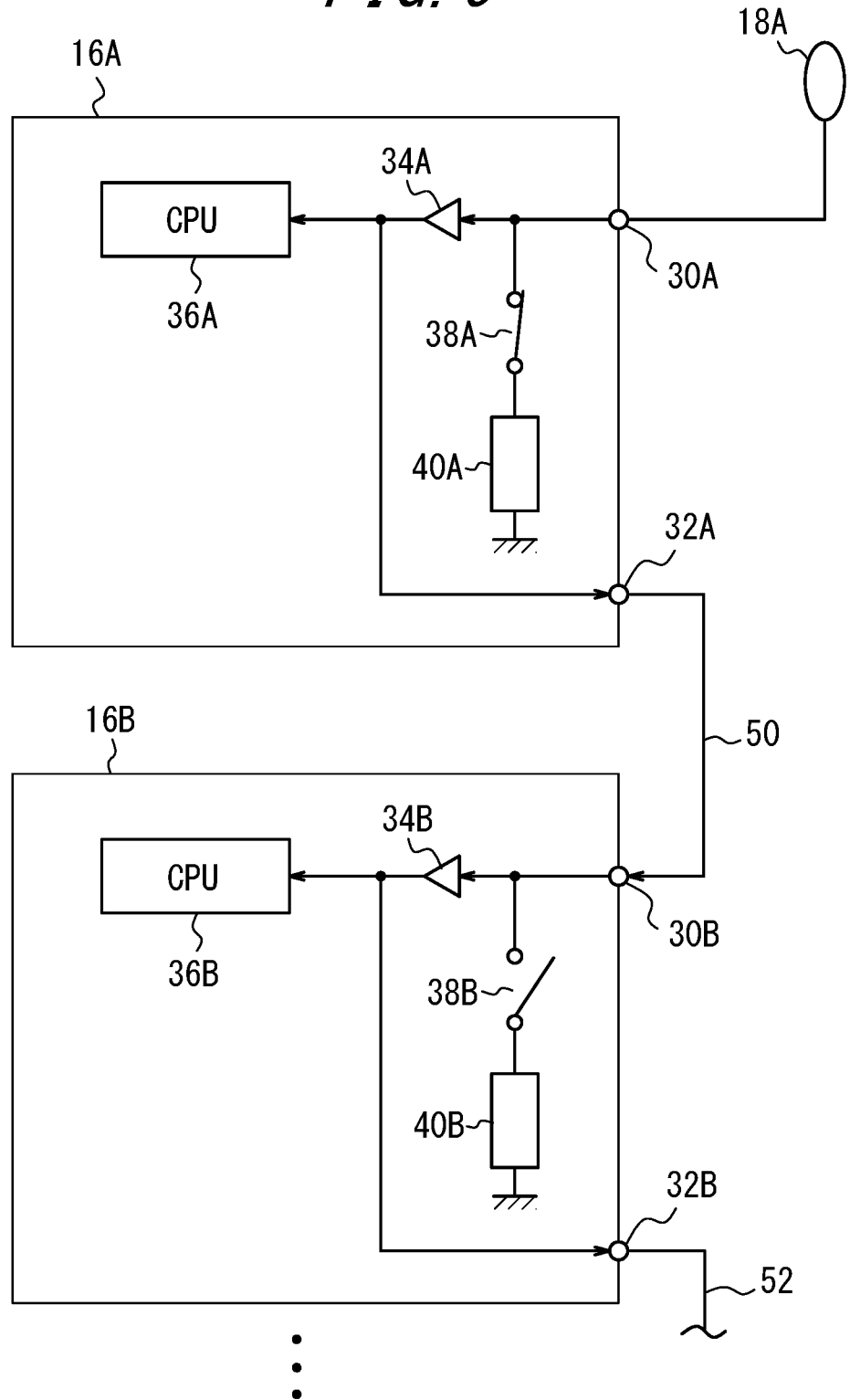
FIG. 9 is a functional block diagram further detailing controllers of the power generation apparatuses according to the third embodiment.

FIG. 9 is a functional block diagram further detailing the controllers of the power generation apparatuses 10A to 10C of the present embodiment. Although FIG. 9 illustrates the controller 16A of the power generation apparatus 10A and the controller 16B of the power generation apparatus 10B alone, the controller 16C of the power generation apparatus 10C may have a configuration similar to the configurations of the controllers 16A and 16B. Note that, in FIG. 9, solid lines represent paths of the control signal and a signal to communicate various information. Also, since the controllers 16A and 16B may have similar configurations, the following describes about the controller 16A alone, omitting a description of the controller 16B.

As illustrated in FIG. 9, the controller 16A includes an input terminal 30A, an output terminal 32A, an amplifier 34A, a controller CPU 36A, a switch 38A, and a resistor 40A.

The input terminal 30A is a sensor signal input terminal to receive an input of a detection signal of the current sensor 18A. Also, the output terminal 32A is a sensor signal output terminal for outputting the detection signal of the current senor 18A from the power generation apparatus 10A to the power generation apparatus 10B. The input terminal 30A and the output terminal 32A may be various connectors such as plugs, jacks, and receptacles.

The amplifier 34A is an amplifier for amplifying a sensor signal detected by the current sensor 18A. The amplifier 34A may be an amplifier of various types. The sensor signal input to the input terminal 30A is amplified by the amplifier 34A and then input to the controller CPU 36A. Also, the sensor signal input to the input terminal 30A is amplified by the amplifier 34A and then output from the output terminal 32A.

The controller CPU 36A performs various control including determining whether a direction of the current detected by the current sensor 18A is forward or backward and monitoring the current value of the current. Also, the controller CPU 36A, based on the direction of the current and the current value as described above, controls the power generation unit 12A and the power conversion unit 14A in order to control the power output from the power generation apparatus 10A.

The switch 38A allows or prohibits transmission of the sensor signal input from the input terminal 30A to the resistor 40A. The switch 38A may be a switch of any type.

The resistor 40A is a resistor for performing impedance matching. A description of an operation of the resistor 40A will be provided infra.

As illustrated in FIG. 9, the controller 16A is provided with the input terminal 30A for receiving the input of the sensor signal and the output terminal 32A for outputting the sensor signal, and the controller 16B is provided with the input terminal 30B for receiving the input of the sensor signal and the output terminal 32B for outputting the sensor signal. As illustrated in FIG. 9, also, the current sensor 18A for detecting the current of the reverse power flow is coupled to the input terminal 30A of the controller 16A of the power generation apparatus 10A. FIG. 9 illustrates an example in which the input terminal 30A and the output terminal 32A are provided to the controller 16A, and the input terminal 30B and the output terminal 32B are provided to the controller 16B. However, the input terminals 30A and the output terminals 32A may be provided to any portion of the power generation apparatus 10A, and similarly, the input terminal 30B and the output terminal 32B may be provided to any portion of the power generation apparatus 10B.

The sensor signal input to the input terminal 30A is converted from the current value to a voltage value by the resistor 40A for performing the impedance matching. Also, the sensor signal converted into the voltage value is amplified to a predetermined voltage by the amplifier 34A and then input to the controller CPU 36A.

Further, the output terminal 32A of the controller 16A of the power generation apparatus 10A is coupled to the input terminal 30B of the controller 16B of the power generation apparatus 10B, and output terminals of the power generation apparatus 10B and thereafter and input terminals of the power generation apparatus 10C and thereafter may be coupled to one another in a similar manner. The coupling between the input terminals and the output terminals in this manner eliminates the necessity for the resistor (e.g., 40B) for performing the impedance matching. Therefore, the controller 16B may maintain the matching of impedance by turning off the switch 38B. That is, the controller 16A of the power generation apparatus 16A may perform the impedance matching of an input signal before outputting the input signal to the power generation apparatus 10B.

According to the present embodiment, as described above, the input units of the disclosure include elements such as the input terminals 30A and 30B. According to the present embodiment, also, the output units of the disclosure include the output terminals 32A and 32B and elements through which the signals input to the input units travel to be output from the output terminals 32A and 32B.

Therefore, the power generation apparatus 10A of the present embodiment includes the input unit for receiving the input of the signal from of the current sensor 18A for detecting the current flowing to the grid 100 and the output unit for causing the signal input to the input unit to diverge and outputting a diverging signal. Here, the output unit is configured to output the diverging signal to the power generation apparatus 10B coupled to the power generation apparatus 10A.

Upon start of the operation of the power generation system 1 according to the present embodiment, the current sensor may be connected to one of a plurality of power generation apparatuses (e.g., the power generation apparatuses 10 A to 10C), such that the reverse power flow may be detected. In this case, the current sensor does not need to be directly connected to the other power generation apparatuses among the plurality of power generation apparatuses (e.g., the power generation apparatuses 10 A to 10C). The following is a description of an operation performed when, for example, the current sensor 18A is connected to the power generation apparatus 10A for receiving the input of the sensor signal and outputting the sensor signal to the power generation apparatus 10B.

In the power generation system 1 illustrated in FIG. 8, when demand by the load 200 for the power consumption thereof exceeds combined maximum power output from the power generation apparatuses 10A to 10C, the power is purchased from the grid 100. In this case, the current sensor 18A of the power generation apparatus 10A detects a current of the forward power flow. When the current sensor 18 detects the current of the forward power flow as described above, the controller 16A controls the power generation apparatus 10A such that the power generation apparatus 10A outputs maximum power. In this case, the controller 16B and the controller 16C also control the power generation apparatus 10B and the power generation apparatus 10C, respectively, such that the power generation apparatuses 10B and 10C generate respective maximum power. Then, a shortage of the output of the power generation system 1 for the demand by the load 200 will be covered by the power purchased from the grid 100.

In the power generation system 1, on the other hand, when the combined maximum power output from the power generation apparatuses 10A to 10C is greater than the demand by the load 200 for the power consumption thereof, the current sensor 18A of the power generation apparatus 10A detects a current of the reverse power flow. In this case, the power generation apparatuses 10A to 10C perform control of the present embodiment as described later. That is, the controller 16A reduces the output of the power generated by the power generation apparatus 10A. Here, the controller 16A outputs the sensor signal detected by the current sensor 18A to the power generation apparatus 10B at all times.

Then, the controller 16B of the power generation apparatus 10B, when determining based on the sensor signal input by the power generation apparatus 10A that the reverse power flow has occurred, reduces the output of the power generated by the power generation unit 12B. Here, the controller 16B outputs the sensor signal input by the power generation apparatus 10A to the power generation apparatus 10C at all times. Then, the controller 16C of the power generation apparatus 10C, when determining based on the sensor signal input by the power generation apparatus 10B that the reverse power flow has occurred, reduces the output of the power generated by the power generation unit 12C.

In the present embodiment, the controllers 16A to 16C obtain the current value and the current direction detected by the current sensor 18A, which is a single unit, and performs the control to prevent the power generated by the power generation apparatuses 10A to 10C from flowing backward to the grid 100. In this case, the power generation is reduced in accordance with the respective current values of the respective reverse power flows recognized in the power generation apparatuses 10A, 10B, and 10C, and the power output is reduced until the current direction detected by the current sensor 18A indicates "power purchasing" from the grid 100.

According to the present embodiment, as described above, one current sensor detects the current of the reverse power flow flowing between the power generation apparatus 10A and other power generation apparatus(es) (the power generation apparatus 10B and/or the power generation apparatus 10C), coupled to the power generation apparatus 10A, and the grid 100. According to the present embodiment, also, the controller 16A transmits the sensor signal detected by the current sensor 18A to other power generation apparatus(es) (the power generation apparatus 10B and/or the power generation apparatus 10C). Further, the controllers 16A to 16C of the power generation apparatuses 10A to 10C, when the reverse power flow has occurred, control to reduce the outputs of the power respectively generated by the power generation units 12A to 12C based on the sensor signal received. In the present embodiment, here, the controller 16A may perform the impedance matching on the sensor signal before outputting the sensor signal to other power generation apparatus(es) (the power generation apparatus 10B and/or the power generation apparatus 10C).

As described above, when the sensor signal detected by the current sensor 18A is input to the power generation apparatus 10A, the power generation apparatus 10A causes the sensor signal to diverge and outputs the diverging sensor signal to the power generation apparatus 10B. When the diverging sensor signal is input to the power generation apparatus 10B by the power generation apparatus 10A, the power generation apparatus 10B causes the diverging sensor signal to further diverge and outputs a further diverging sensor signal to the power generation apparatus 10C. In this way, the power generation apparatus 10C receives the sensor signal from the power generation apparatus 10B. Also, the controllers 16A, 16B, 16C of the power generation apparatuses 10A, 10B, and 10C, based on the sensor signal received, control to reduce the outputs of the power respectively generated by the power generation units 12A, 12B, and 12C.

Figure 10:
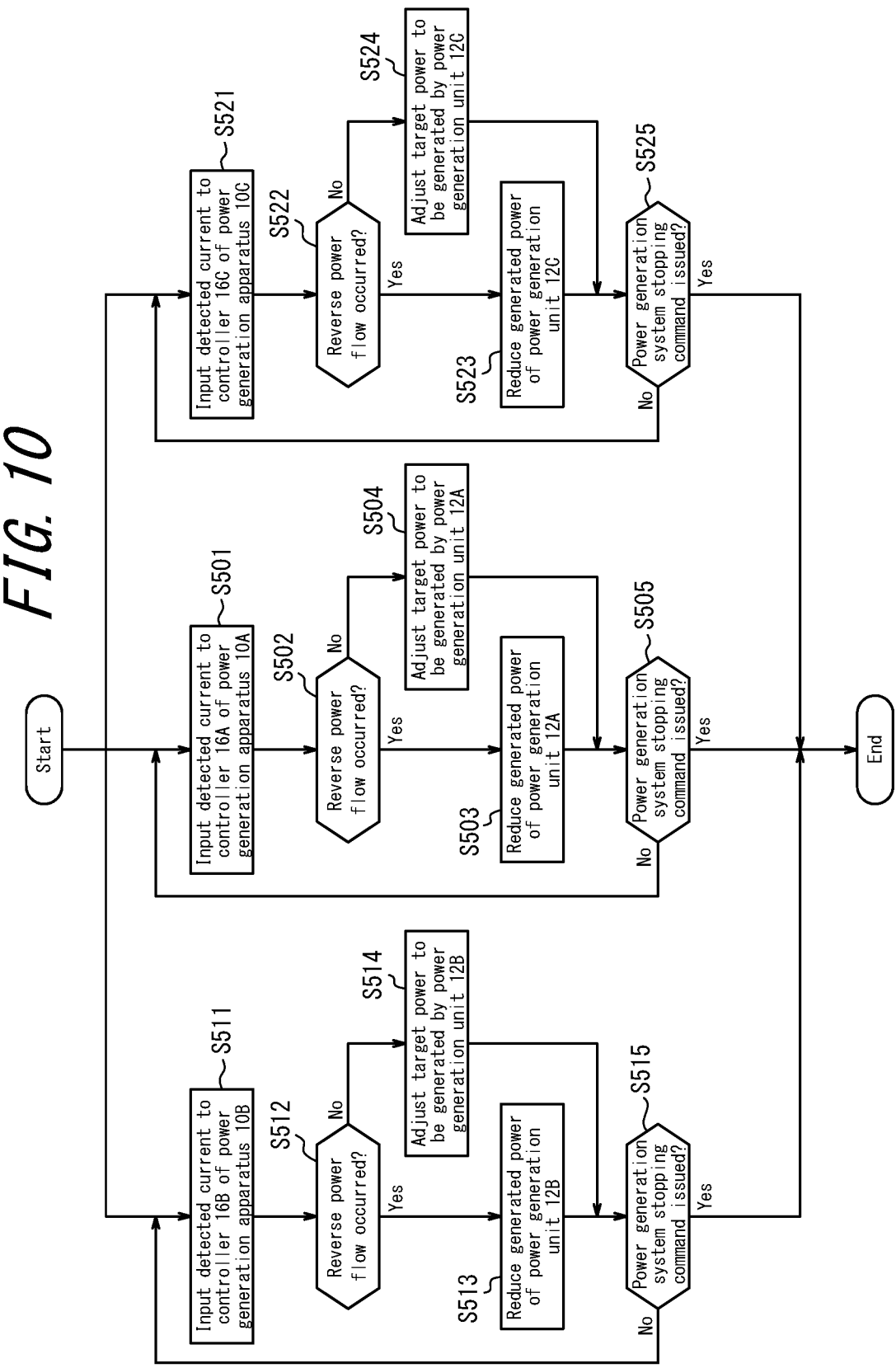
FIG. 10 illustrates a control flow of the power generation system according to the third embodiment.

FIG. 10 is a flowchart illustrating a control method of the power generation system 1 of the present embodiment. After the power generation system 1 starts the operation, the controller 16A of the power generation apparatus 10A, upon reception of a result of the detection of the current from the current sensor 18A (step S501), determines whether the reverse power flow has occurred from the power generation apparatuses 10A to 10C to the grid 100 based on the result of the detection (step S502). When the controller 16A determines at step S502 that the reverse power flow has occurred, the controller 10A controls to reduce the power generation of the power generation unit 12A (step S503). At this time, the controller 16A may reduce the power generation based on the magnitude of the current of the reverse power flow detected. Or, the controller 16A may communicate with the controller 16B of the power generation apparatus 10B and the controller 16C of the power generation apparatus 10C and perform control cooperating with the power generation apparatuses 10B and 10C such that the power generation system 1 in its entirety suppresses the reverse power flow. On the other hand, when the controller 16A determines at step S502 that the reverse power flow has not occurred, the controller 16A, based on the result of the detection of the current at step S501, adjusts the target power to be generated by the power generation unit 12A (step S504). In this adjustment, the target power to be generated by the power generation unit 12A may be controlled to increase in accordance with the current value of the forward power flow detected by the current sensor 18A. Or, the controller 16A may communicate with the controller 16B of the power generation apparatus 10B and the controller 16C of the power generation apparatus 10C and perform control cooperating with the power generation apparatuses 10B and 10C such that the power generation system 1 in its entirety reduces the forward power flow so as to suppress the power-purchasing. Lastly, the controller 16A determines whether the "output stopping" command is issued to the power generation system 1 (step S505). When the "output stopping" command has not been issued, the controller 16A returns to step S501 to control the power generation based on the result of the detection by the current sensor 18A.

In the flowchart of FIG. 10, a flow of the operation of the power generation apparatus 10B is illustrated from step S511 to step S515. Also, a flow of the operation of the power generation apparatus 10C is illustrated from step S521 to step S525. To the power generation apparatuses 10B and 10C also, the signal the same as the detection signal of the current sensor 18A input to the input terminal 30A of the power generation apparatus 10A is input from the input terminal 30B illustrated in FIG. 9 and the input terminal 30C (steps S511 and S521). The control of the power generation apparatuses 10B and 10C may be essentially similar to the control of the power generation apparatus 10A. Note that, at respective steps S513 and S523, respective reducing amounts of the power generated by the power generation apparatuses 10B and 10C may be separately determined by the controller 16B of the power generation apparatus 10B and the controller 16C of the power generation apparatus 10C. Or, at respective steps S513 and S523, the controllers 16A to 16C of the power generation apparatuses 10A to 10C may communicate with one another and control to appropriately share a reducing amount of the power generation such as the power generation system 1 in its entirety suppresses the reverse power flow. Also, at respective steps S514 and S524, the controller 16B of the power generation apparatus 10B and the controller 16C of the power generation apparatus 10C may separately adjust the target power to be generated based on the current value of the forward power flow detected at respective steps S511 and S521. Or, at steps S514 and S524, the controllers 16A to 16C of the power generation apparatuses 10A to 10C may communicate with one another and control to appropriately share an increasing amount of the power generation such that the power generation system 1 in its entirety reduces the forward power flow to suppress the power-purchasing.

Note that, although at respective steps S502, S512, and S522 of FIG. 10 the controllers 16A to 16C separately determine whether the reverse power flow has occurred, the present embodiment is not limited to this configuration. For example, the controller 16A may determine whether the reverse power flow has occurred and communicate with the controllers 16B and 16C to notify the controllers 16B and 16C of a result of the determination.

According to the present embodiment, as described above, since the output (the sensor signal) from the current sensor 18A is sequentially transmitted to the plurality of power generation apparatuses 10A to 10C each of which having a function to prevent the reverse power flow, the number of current sensors may be reduced to one. Therefore, cost of installing the current sensor may be reduced, and further, a space for installing the current sensor may also be reduced.

According to the present embodiment, also, the transmission of the signal detected by one current sensor eliminates the necessity for communication protocols between the power generation apparatuses 10A to 10C. According to the present embodiment, also, since the sensor signal may be an analogue signal independent of a clock frequency, a transmission delay may be suppressed. According to the present embodiment, further, since the power generation apparatuses 10A to 10C include respective buffer amplifiers, a cascade connection may be employed for the connection between the output and the input of the sensor signal.

According to the disclosure, as described above, since the power generation apparatuses do not need to include respective current sensors for detecting the reverse power flow, cost may be reduced, and more room for installation becomes available in the distribution board, improving workability.

Also, when, as conventionally performed, the outputs of the respective power generation apparatuses are controlled by using the communication therebetween upon occurrence of the reverse power flow, abnormality of the distributed power source or a communication error sometimes cause a delay in suppression of the reverse power flow. In this case, there is a risk that the reverse power flow may not be suppressed within a prescribed period of time. According to the present disclosure, however, upon occurrence of the reverse power flow, the output power may be reduced within the prescribed period of time.

Although the disclosure has been described based on the figures and the embodiments, it is to be understood that those who are ordinarily skilled in the art may easily implement various modifications and changes based on the disclosure. Accordingly, such modifications and changes are included in the scope of the disclosure. For example, functions and the like included in each constituent, means, and step may be rearranged without logical inconsistency, so as to combine a plurality of constituents or steps together or to separate them. Also, the embodiments of the disclosure described above should not be construed in a strict sense but may also be practiced by appropriately combining features of the embodiments or omitting some of the features.

Figure 11:
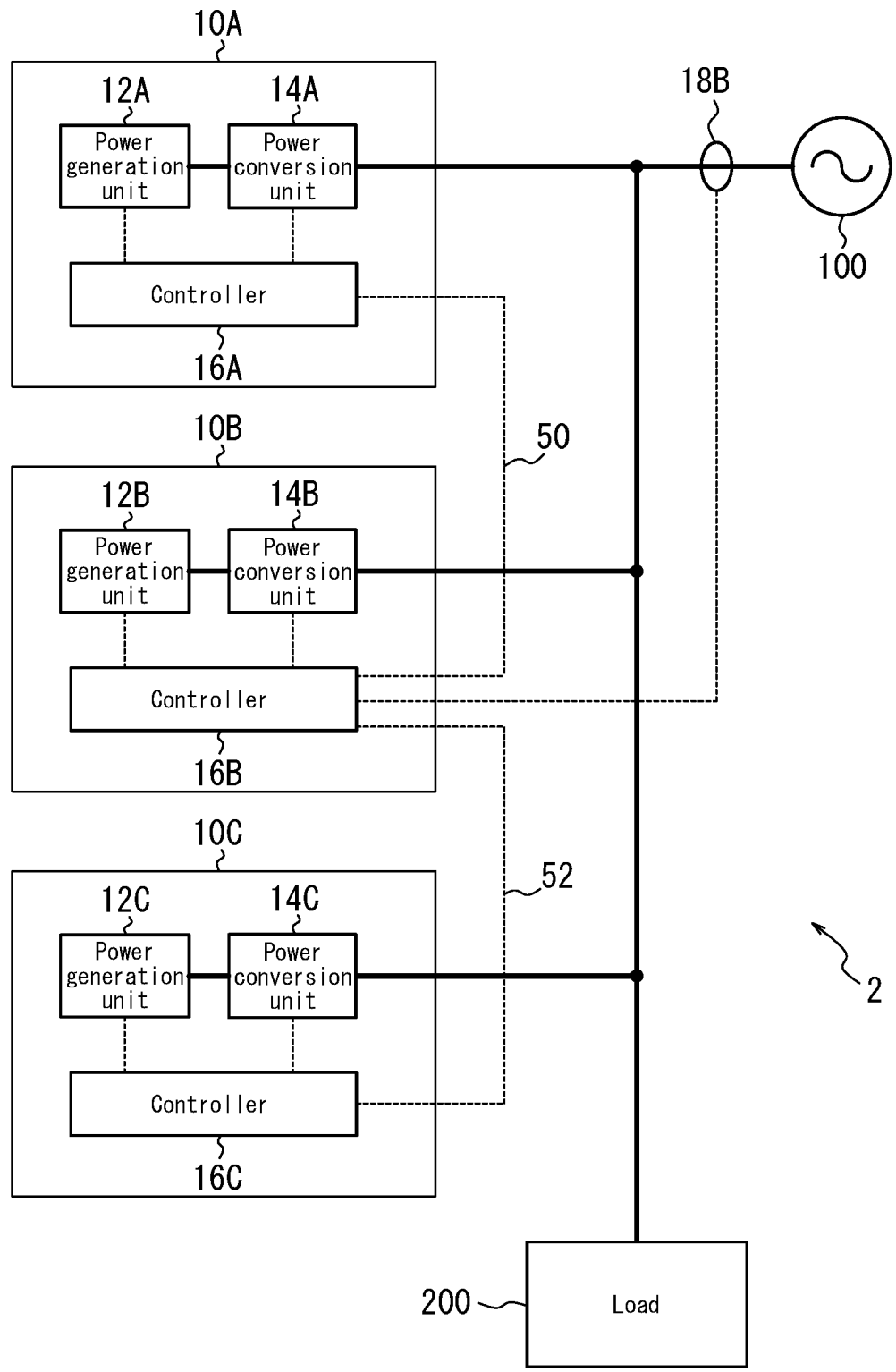
FIG. 11 is a functional block diagram schematically illustrating a power generation system configured with power generation apparatuses according to a variation of the third embodiment.
Figure 12:
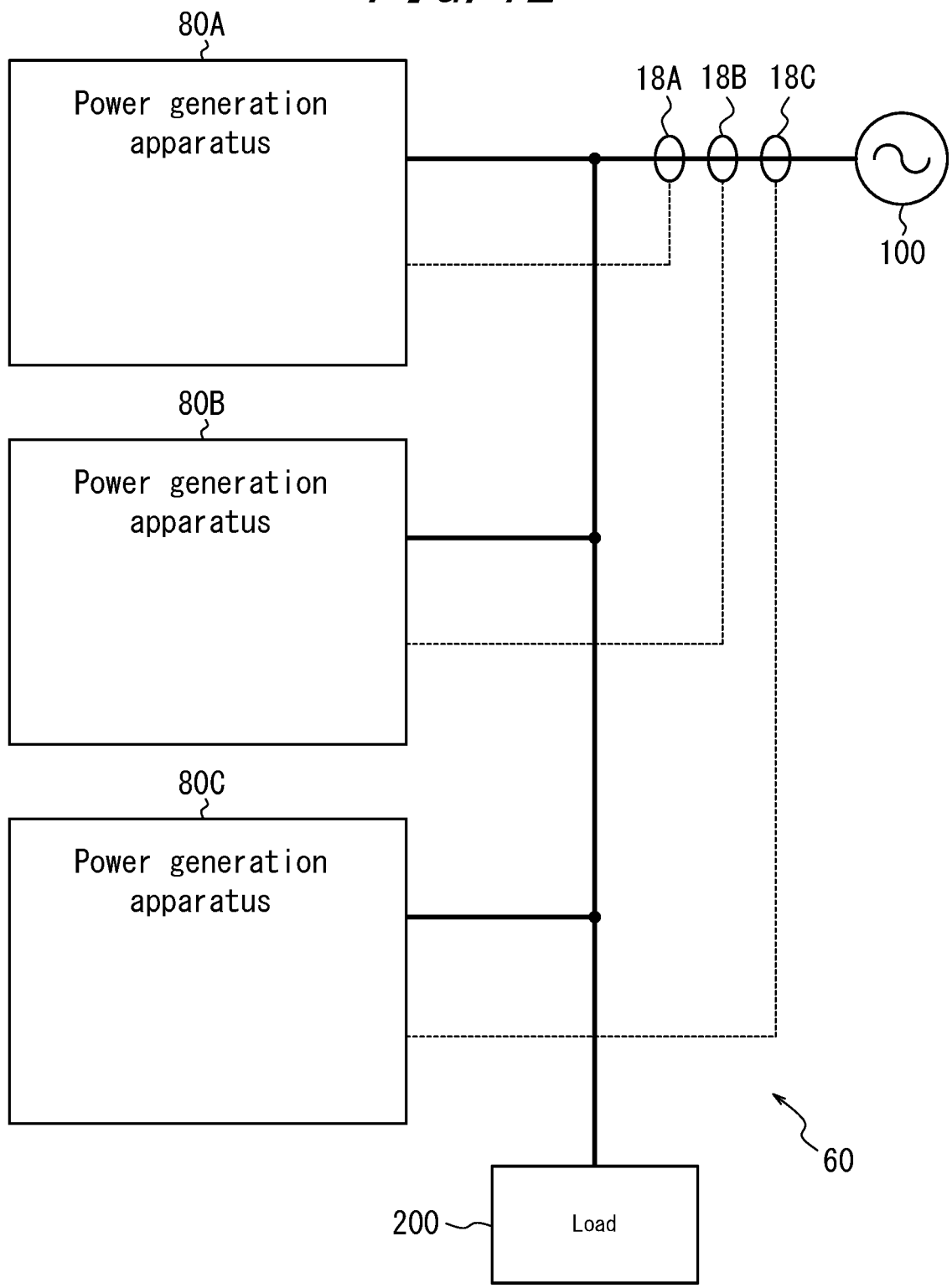
FIG. 12 is a functional block diagram schematically illustrating a conventional power generation system.

For example, the connection between the power generation apparatuses 10A to 10C is not limited to the connection illustrated in FIG. 8 but may take various manners. For example, as illustrated in FIG. 11, a current sensor 18B may be coupled to the controller 16B of the power generation apparatus 10B. In this case, the controller 16B of the power generation apparatus 10B and the controller 16A of the power generation apparatus 10A may be coupled to each other via the control line 50, and the controller 16B of the power generation apparatus 10B and the controller 16C of the power generation apparatus 10C may be coupled to each other via the control line 52.

Also, the disclosure is not directed to the power generation apparatuses 10A to 10C alone but may be directed also to the power generation system 1. That is, the disclosure may be substantialized as a power generation system configured with a plurality of power generation apparatuses (e.g., 10A, 10B, and 10C) which interconnect with the grid 100 and are capable of controlling the output of the power supplied to the load 200.

In this case, a first power generation apparatus (e.g., 10A) among a plurality of power generation apparatuses is configured to cause the input signal from the current sensor 18A for detecting the current flowing to the grid 100 to diverge and output a diverging input signal to other power generation apparatus (e.g., 10B) among the plurality of power generation apparatuses. Also, the power generation apparatus 10A, based on the input signal, controls to reduce the output power of the power generation apparatus 10A. Further, the power generation apparatus 10B, based on the diverging input signal received from the power generation apparatus 10A, controls to reduce the output power of the power generation apparatus 10B.

Further, the disclosure may also be substantialized as a power generation method of a plurality of power generation apparatuses (e.g., 10A, 10B, and 10C) which interconnect with the grid 100 and are capable of controlling the output of the power supplied to the load 200.

Further, the present embodiment may be combined with, for example, the first embodiment. That is, for example, during normal operation, as described in the first embodiment, in such a manner that the power generation system 1 in its entirety provides the power to the load 200 in the most efficient manner, the power generation apparatus 10A determines the respective target output power of the power generation apparatuses 10A to 10C. When it is necessary to rapidly reduce the output power of the power generation apparatuses 10A to 10C due to the occurrence of the reverse power flow in a certain magnitude or greater, as described in the third embodiment, the power generation apparatuses 10A to 10C may reduce the respective output power based on the input signal from the current sensor 18A.

Many aspects of the disclosure may be represented by a series of operations executed by a computer system or other hardware those are capable of executing a program instruction. The computer system or the other hardware includes, for example, a general-purpose computer, a PC (personal computer), a special purpose computer, a workstation, PCS (Personal Communications System; a personal mobile communication system), an electronic notepad, a laptop computer, and other programmable data processing apparatuses. Note that in the embodiment the various operations are executed by a dedicated circuit implemented with a program instruction (software) (e.g., discrete logic gates intercoupled to perform a specific function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a processor, a controller, a microcontroller, a microprocessor, an electronic apparatus, and other apparatuses designed to be capable of executing the functions described, and/or a combination thereof. The embodiment presented herein is implemented by, for example, hardware, software, firmware, middleware, a microcode, or any combination thereof.

Also, a machine-readable non-transitory storage medium used herein may include a solid state memory or a tangible carrier (medium) readable by the computer such as a magnetic disk and an optical disk, and stores an appropriate set of computer instructions such as program modules and a data structure those for causing the processor to execute the technique disclosed herein. The computer-readable medium includes an electric connection with at least one wiring, a magnetic disk storage media, other magnetic or optical storage devices (e.g., a CD (Compact Disk), LaserDisc® (LaserDisc is a registered trademark in Japan, other countries, or both), DVD® (DVD is a registered trademark in Japan, other countries, or both), and Blu-ray Disc® (Blu-ray Disc is a registered trademark in Japan, other countries, or both), a portable computer disk, RAM (Random Access Memory), ROM (Read-Only Memory), a ROM such as an EPROM, an EEPROM, or a flash memory that is rewritable and programmable, other tangible storage media capable of storing information, or any combination thereof. The memory may be provided inside and/or outside the processor/processing unit. As used herein, the term "memory" refers to all types of a long-term memory, a short-term memory, a volatile memory, a non-volatile memory, and other memories. A type of the memory, the number of memories, and a type of the medium to store the information are not limited.

Note that the system of the disclosure includes various modules and/or units for executing specific functions, and the modules and/or the units are schematically illustrated for the purpose of brief description of functionality thereof and do not necessarily represent specific hardware and/or software. As described above, various aspects of the disclosure may be implemented in various embodiments, and all the various embodiments are included in the scope of the disclosure.

REFERENCE SIGNS LIST 1, 2 power generation system
10A, 10B, 10C power generation apparatus
12A, 12B, 12C power generation unit
14A, 14B, 14C power conversion unit
16A, 16B, 16C controller
18, 18A, 18B, 18C current sensor
20A, 20B, 20C power generation apparatus
26A, 26B, 26C controller
27A, 27B communication line (first communication line)
28A, 28B second communication line
30A, 30B input terminal
32A, 32B output terminal
34A, 34B amplifier
36A, 36B controller CPU
38A, 38B switch 40A, 40B resistor
50, 52 control line
60 power generation system
80A, 80B, 80C power generation apparatus
100 grid
200 load

The invention claimed is:

1. A control method of a power generation system configured with a power generation apparatus and at least one other power generation apparatus coupled to the power generation apparatus, the power generation system configured to interconnect with a grid and supply power to a load, wherein
the control method performed by the power generation apparatus includes steps of:
obtaining a current value between the power generation system and the grid,
determining, based on the current value obtained, target power to be generated by the power generation apparatus and the other power generation apparatus, and
notifying the other power generation apparatus of the target power.

2. The control method of the power generation system according to claim 1, further comprising a step of performing communication when the current value indicates a current in a direction of a reverse power flow, so as to stop an output of at least one of the power generation apparatus and the other power generation apparatus.

3. The control method of the power generation system according to claim 1, further comprising a step of performing communication, in response to a reduction in power consumption of the load, so as to stop an output of at least one of the power generation apparatus and the other power generation apparatus.

4. A control method of a power generation system configured with a power generation apparatus and at least one other power generation apparatus coupled to the power generation apparatus, the power generation system configured to interconnect with a grid and supply power to a load, wherein the control method includes:
a step of obtaining a sensor signal from a current sensor configured to detect a current flowing between the grid and the power generation system by the power generation apparatus,
an output step of outputting the obtained sensor signal to the other power generation apparatus by the power generation apparatus,
a first control step of, based on the sensor signal, controlling to reduce an output of power generated by the power generation apparatus, and
a second control step of, based on the sensor signal output from the power generation apparatus, controlling to reduce an output of power generated by the other power generation apparatus.

5. The control method of the power generation system according to claim 4, wherein the output step further includes a matching output step of matching impedance of the sensor signal before outputting the sensor signal to the other power generation apparatus.

6. A power generation system comprising:
a power generation apparatus; and
at least one other power generation apparatus coupled to the power generation apparatus, the power generation system configured to interconnect with a grid and supply power to a load, wherein
the power generation apparatus includes a controller that determines, based on a current detected by a current sensor between the power generation system and the grid, target power to be generated by the power generation apparatus and the other power generation apparatus and notifies the other power generation apparatus of the target power.

7. The power generation system according to claim 6, comprising a communicator configured to allow communication between the power generation apparatus and the other power generation apparatus, wherein
the controller of the power generation apparatus, when the current detected by the current sensor flows in a direction of a reverse power flow, controls to stop at least one of an output of the power generation apparatus and an output of the other power generation apparatus via the communicator.

8. The power generation system according to claim 6, comprising a communicator configured to allow communication between the power generation apparatus and the other power generation apparatus, wherein
the controller of the power generation apparatus, in response to a reduction in power consumption of the load, controls to stop at least one of output of the other power generation apparatus via the communicator.

9. A power generation system comprising:
a power generation apparatus; and
at least one other power generation apparatus coupled to the power generation apparatus, the power generation system configured to interconnect with a grid and supply power to a load,
wherein the power generation apparatus is configured to obtain a sensor signal from a current sensor configured to detect a current flowing between the grid and the power generation system and output the obtained sensor signal to the other power generation apparatus via a communicator, and includes a first controller configured to control, based on the sensor signal, to reduce an output of power generated by the power generation apparatus, and
the other power generation apparatus includes a second controller configured to control, based on the sensor signal output from the power generation apparatus, to reduce an output of power generated by the other power generation apparatus.

10. The power generation system according to claim 9, wherein the first controller of the power generation apparatus matches impedance of the sensor signal before outputting the sensor signal to the other power generation apparatus.

11. A power generation apparatus coupled to at least one other power generation apparatus, the power generation apparatus comprising a controller configured to interconnect with a grid and supply power to a load, wherein
the controller of the power generation apparatus determines, based on a current detected by a current sensor between the power generation apparatus and the other power generation apparatus, and the grid, target power to be generated by the power generation apparatus and the other power generation apparatus and notifies the other power generation apparatus of the target power via a communicator.

12. A power generation apparatus coupled to at least one other power generation apparatus, the power generation apparatus configured to interconnect with a grid and supply power to a load, including
a power generator configured to interconnect with the grid and generate power supplied to the load, and a controller configured to control an output of power generated by the power generator, wherein the controller is configured to receive a sensor signal from a current sensor configured to detect the current flowing between the grid, and the power generation apparatus and the other power generation apparatus, and is configured to output the sensor signal to the other power generation apparatus, and wherein the controller, based on the sensor signal controls to reduce the output of the power generated by the power generator.

13. The power generation apparatus according to claim 12, wherein the controller matches impedance of the sensor signal before outputting the sensor signal to the other power generation apparatus.

* * * * *